United States Patent
Kurihara et al.

(10) Patent No.: US 11,532,303 B2
(45) Date of Patent: Dec. 20, 2022

(54) AGENT APPARATUS, AGENT SYSTEM, AND SERVER DEVICE

(71) Applicant: HONDA MOTOR CO., LTD., Tokyo (JP)

(72) Inventors: Masaki Kurihara, Wako (JP); Masahiro Kurehashi, Wako (JP); Toshikatsu Kuramochi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 315 days.

(21) Appl. No.: 16/810,897

(22) Filed: Mar. 6, 2020

(65) Prior Publication Data
US 2020/0320999 A1 Oct. 8, 2020

(30) Foreign Application Priority Data
Mar. 11, 2019 (JP) .............................. JP2019-043700

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
CPC ... G06Q 50/30; G10L 15/22; G10L 2015/223; H04W 4/40; G06F 3/167
See application file for complete search history.

(56) References Cited

U.S. PATENT DOCUMENTS

| | | | |
|---|---|---|---|
| 10,501,055 B1* | 12/2019 | Yi | B60R 25/257 |
| 11,059,494 B1* | 7/2021 | Chan | B60W 50/0098 |
| 11,200,892 B1* | 12/2021 | Stoops | G06V 10/811 |
| 2016/0370191 A1* | 12/2016 | Utsugi | H04L 67/1097 |
| 2017/0197729 A1* | 7/2017 | Derenick | G08G 5/0056 |
| 2018/0003512 A1* | 1/2018 | Lynch | G01C 21/3841 |
| 2018/0122378 A1* | 5/2018 | Mixter | H04L 67/306 |
| 2018/0190264 A1* | 7/2018 | Mixter | G10L 15/22 |
| 2019/0137287 A1* | 5/2019 | Pazhayampallil | G05D 1/0291 |

(Continued)

FOREIGN PATENT DOCUMENTS

| | | |
|---|---|---|
| JP | 2000-020888 | 1/2000 |
| JP | 2001-056225 | 2/2001 |

(Continued)

OTHER PUBLICATIONS

Japanese Office Action for Japanese Patent Application No. 2019-043700 dated Oct. 4, 2022.

*Primary Examiner* — Mark Villena
(74) *Attorney, Agent, or Firm* — Amin, Turocy & Watson, LLP

(57) ABSTRACT

An agent device includes an acquirer configured to acquire an utterance of a user of a first vehicle, and a first agent controller configured to perform processing for providing a service including causing an output device to output a response of voice in response to an utterance of the user of the first vehicle acquired by the acquirer. When there is a difference between a service which is utilized in the first vehicle and is available from one or more agent controllers including at least the first agent controller and a service which is utilized in a second vehicle and is available from one or more agent controllers, the first agent controller provides information on the difference.

22 Claims, 21 Drawing Sheets

(56) References Cited

U.S. PATENT DOCUMENTS

| | | | | |
|---|---|---|---|---|
| 2019/0197468 | A1* | 6/2019 | Endo | H04W 4/40 |
| 2019/0318159 | A1* | 10/2019 | Blanc-Paques | G06Q 50/30 |
| 2019/0346840 | A1* | 11/2019 | Valeri | G05D 1/0088 |
| 2019/0375354 | A1* | 12/2019 | Akella | B60R 16/037 |
| 2020/0250772 | A1* | 8/2020 | Höflich | G06Q 10/047 |
| 2020/0269663 | A1* | 8/2020 | Urano | G05D 1/0088 |
| 2020/0279314 | A1* | 9/2020 | Wylie | H04W 4/023 |
| 2022/0076193 | A1* | 3/2022 | Chen | G06Q 50/30 |

FOREIGN PATENT DOCUMENTS

| | | |
|---|---|---|
| JP | 2005-313886 | 11/2005 |
| JP | 2006-335231 | 12/2006 |
| JP | 2013-216258 | 10/2013 |
| JP | 2019-034684 | 3/2019 |

* cited by examiner

| IDENTIFICATION INFORMATION OF VEHICLE | IDENTIFICATION INFORMATION OF USER | DATE AND TIME | UTTERANCE AND RESPONSE |
|---|---|---|---|
| 001 (M2) | 001 | 20190203/12:00 | UTTERANCE<br>LET ME KNOW ROUTE TO X |
| 001 (M2) | 001 | 20190203/12:00 | RESPONSE INFORMATION<br>GO STRAIGHT AHEAD<br>ALONG Y ROAD |
| 001 (M2) | ⋮ | ⋮ | ⋮ |

FIG. 12

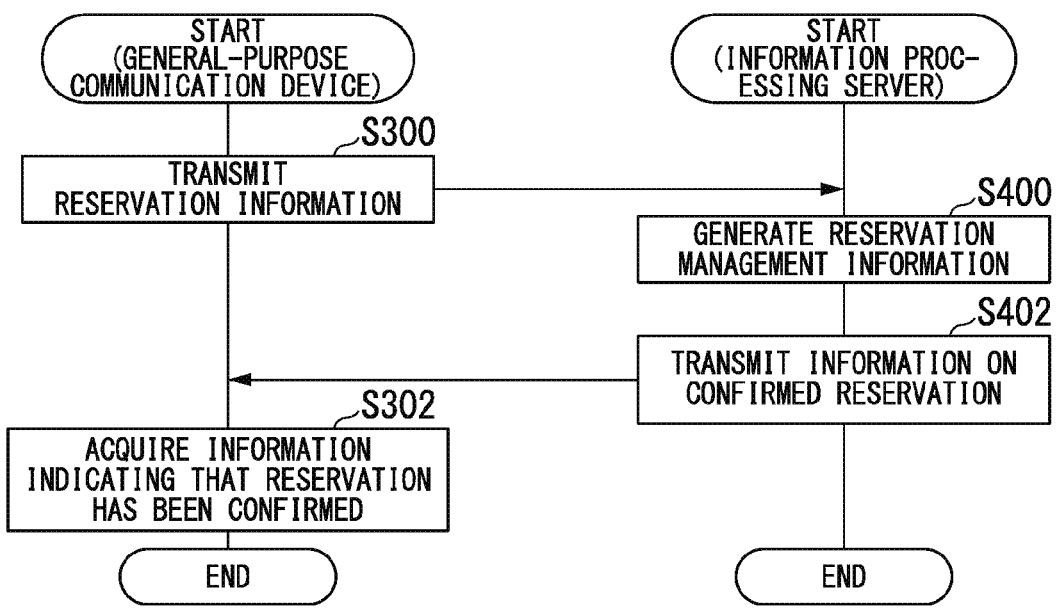

| IDENTIFICATION INFORMATION OF VEHICLE | UTILIZATION TIME | IDENTIFICATION INFORMATION OF PERSON WHO MADE RESERVATION (USER) | IC CARD IDENTIFICATION INFORMATION |
|---|---|---|---|
| 001 (M1) | 20190301<br>0900~1500 | 001 | IC001 |

AGENT APPARATUS, AGENT SYSTEM, AND SERVER DEVICE

CROSS-REFERENCE TO RELATED APPLICATION

This application is based upon and claims the benefit of priority from Japanese Patent Application No. 2019-043700, filed Mar. 11, 2019, the content of which is incorporated herein by reference.

BACKGROUND

Field

The present invention relates to an agent device, an agent system, and a server device.

Description of Related Art

In the related art, a technology related to an agent function for providing information on driving support, control of a vehicle, other applications, and the like at a user's request through an interaction with a user of the vehicle has been disclosed (Japanese Unexamined Patent Application, First Publication No. 2006-335231).

In recent years, practical application of mounting an agent function in a vehicle has been promoted, but provision of a service for an agent function mounted in each vehicle has not been studied sufficiently. Therefore, in the technology in the related art, there are cases in which satisfaction of a user in provision of a service for an agent function is low.

SUMMARY

The present invention has been made in consideration of such circumstances, and an object thereof is to provide an agent device, an agent system, and a server device, in which satisfaction of a user can be improved.

An agent device, an agent system, and a server device according to the present invention employ the following configurations.

(1): According to an aspect of the present invention, there is provided an agent device including an acquirer configured to acquire an utterance of a user of a first vehicle, and a first agent controller configured to perform processing for providing a service including causing an output device to output a response of voice in response to an utterance of the user of the first vehicle acquired by the acquirer. When there is a difference between a service which is utilizable in the first vehicle and is available from one or more agent controllers including at least the first agent controller and a service which is utilizable in a second vehicle and is available from one or more agent controllers, the first agent controller provides information on the difference.

(2): In the aspect according to (1) described above, the first agent controller is included in the second vehicle. When there is a difference between a service available from the first agent controller and a service available from a second agent controller with a service name the same as a name of a service provided from the first agent controller in the second vehicle, the first agent controller provides information on the difference.

(3): In the aspect according to (2) described above, the first agent controller provides information on a service which is available from the second agent controller but is not available from the first agent controller as information on the difference.

(4): In the aspect according to (2) or (3) described above, the first agent controller provides information on a service which is available from the first agent controller but is not available from the second agent controller as information on the difference.

(5): In the aspect according to (1) described above, when there is a difference between a service which has already been provided to the user from a second agent controller with a service name the same as a name of a service provided from the first agent controller in the second vehicle and a service available for the user from the first agent controller, the first agent controller provides information on the difference.

(6): In the aspect according to (3) or (5) described above, when a request for a service which is not available from the first agent controller itself is acquired, the first agent controller provides information on the difference.

(7): The aspect according to any one of (1) to (6) described above further includes a determiner configured to determine whether or not the difference is present based on first vehicle information on the first vehicle in which the user is on board and second vehicle information on the second vehicle which has been utilized before the user utilizes the first vehicle. The first agent controller provides information on the difference based on a result of determination of the determiner.

(8): In the aspect according to any one of (1) to (7) described above, when provision of a service similar to a service provided upon execution of a particular function of the second vehicle in accordance with an utterance of the user is requested and the first agent controller is not able to respond to the request in the first vehicle, the first agent controller provides information on the difference.

(9): The aspect according to (8) described above further includes a determiner configured to determine whether or not a difference is present between a particular function of the first vehicle and the particular function of the second vehicle based on first vehicle information including a service provided upon execution of the particular function of the first vehicle and second vehicle information including a service provided upon execution of the particular function of the second vehicle in response to an utterance of the user. The first agent controller provides information on the difference based on a result of determination of the determiner.

(10): In the aspect according to any one of (1) to (9) described above, when a degree of freshness of information on a map utilized in the first vehicle is lower than a degree of freshness of information on a map utilized in the second vehicle, the first agent controller provides information on the difference.

(11): The aspect according to (10) described above further includes a determiner configured to determine whether or not a difference is present between the degrees of freshness of information on a map based on first vehicle information including information on the degree of freshness of information on a map utilized in the first vehicle and second vehicle information including information on the degree of freshness of information on a map utilized in the second vehicle. The first agent controller provides information on the difference based on a result of determination of the determiner.

(12): In the aspect according to any one of (1) to (11) described above, when there is a difference between a type of an agent controller performing processing for providing a service which is utilizable in the first vehicle and includes causing an output device to output a response of voice in response to an utterance of the user of the first vehicle acquired by the acquirer and a type of an agent controller performing processing for providing a service which is utilizable in the second vehicle and includes causing an output device to output a response of voice in response to an utterance of the user of the second vehicle acquired by the acquirer, the first agent controller provides information on the difference.

(13): The aspect according to (12) described above further includes a determiner configured to determine whether or not a difference is present between a first type and a second type based on first vehicle information including the first type of the agent controller utilizable in the first vehicle and second vehicle information including the second type of the agent controller utilizable in the second vehicle. The first agent controller provides information on the difference based on a result of determination of the determiner.

(14): In the aspect according to any one of (1) to (13) described above, when there is a difference between a task assigned to the first agent controller itself and a task assigned to the second agent controller provided with a service name the same as a name of a service provided from the first agent controller in the second vehicle, the first agent controller provides information on the difference between the assigned tasks.

(15): The aspect according to (14) described above further includes a determiner configured to determine whether or not a difference is present between the assigned tasks based on first vehicle information including the task assigned to the first agent controller in the first vehicle and second vehicle information including the task assigned to the second agent controller. The first agent controller provides information on the difference between the assigned tasks based on a result of determination of the determiner.

(16): In the aspect according to any one of (1) to (15) described above, when there is a difference between a type of an agent controller performing processing for providing a service which is assigned with a particular task of the first vehicle and includes causing an output device to output a response of voice in response to an utterance of the user of the first vehicle acquired by the acquirer and a type of an agent controller performing processing for providing a service which is assigned with a particular task of the second vehicle and includes causing an output device to output a response of voice in response to an utterance of the user of the second vehicle acquired by the acquirer, the first agent controller provides information on the difference between the types.

(17): The aspect according to (16) described above further includes a determiner configured to determine whether or not a difference is present between a third type and a fourth type based on first vehicle information including the third type of the agent controller assigned with the particular task of the first vehicle and second vehicle information including the fourth type of the agent controller assigned with the particular task of the second vehicle. The first agent controller provides information on the difference based on a result of determination of the determiner.

(18): According to another aspect of the present invention, there is provided an agent device including an acquirer configured to acquire an utterance of a user of a first vehicle, and a first agent controller configured to perform processing for providing a service including causing an output device to output a response of voice in response to an utterance of the user of the first vehicle acquired by the acquirer. When there is a difference between a service available from the first agent controller itself and a service available from a second agent controller with a service name the same as a name of a service provided from the first agent controller in a second vehicle, the first agent controller provides information on the difference.

(19): According to another aspect of the present invention, there is provided an agent device including an acquirer configured to acquire an utterance of a user of a first vehicle, and a first agent controller configured to perform processing for providing a service including causing an output device to output a response of voice in response to an utterance of the user of the first vehicle acquired by the acquirer. When there is a difference between a service which has already been provided to the user from a second agent controller with a service name the same as a name of a service provided from the first agent controller in the second vehicle and a service available for the user from the first agent controller, the first agent controller provides information on the difference.

(20): In the aspect according to any one of (1) to (19) described above, the agent device is mounted in a vehicle.

(21): According to another aspect of the present invention, there is provided an agent system including the agent device according to any one of the aspects (1) to (6) described above, a determiner configured to determine whether or not the difference is present based on first vehicle information on the first vehicle in which the user is on board and second vehicle information on the second vehicle which has been utilized before the user utilizes the first vehicle in accordance with information transmitted from the agent device, and a server device configured to include a transmission controller transmitting particular information based on the difference to the agent device when the determiner determines that a difference is present. The first agent controller provides information on the difference based on the particular information transmitted from the transmission controller.

(22): In the aspect according to (21) described above, the determiner determines whether or not a difference is present between a particular function of the first vehicle and a particular function of the second vehicle based on first vehicle information including a service provided upon execution of the particular function of the first vehicle and second vehicle information including a service provided upon execution of the particular function of the second vehicle in response to an utterance of the user. When the determiner determines that a difference is present between the particular functions, the transmission controller transmits particular information based on the difference between the particular functions to the agent device. The first agent controller provides information on the difference based on the particular information transmitted from the transmission controller.

(23): In the aspect according to (21) or (22) described above, the determiner determines whether or not a difference is present between degrees of freshness of information on a map based on first vehicle information including information on a degree of freshness of information on a map utilized in the first vehicle and second vehicle information including information on a degree of freshness of information on a map utilized in the second vehicle. When the determiner determines that a difference is present, the transmission controller transmits particular information based on the difference between the degrees of freshness of information on a map to the agent device. The first agent controller provides information on the difference based on the particular information transmitted from the transmission controller.

(24): In the aspect according to any one of (21) to (23) described above, the determiner determines whether or not a difference is present between a fifth type and a sixth type based on first vehicle information including the fifth type of an agent controller performing processing for providing a service which is utilizable in the first vehicle and includes causing an output device to output a response of voice in response to an utterance of the user of the first vehicle acquired by the acquirer and second vehicle information including the sixth type of an agent controller performing processing for providing a service which is utilizable in the second vehicle and includes causing an output device to output a response of voice in response to an utterance of the user of the second vehicle acquired by the acquirer. When the determiner determines that a difference is present between the fifth type and the sixth type, the transmission controller transmits particular information based on the difference to the agent device. The first agent controller provides information on the difference based on the particular information transmitted from the transmission controller.

(25): In the aspect according to any one of (21) to (24) described above, the determiner determines whether or not a difference related to the assigned task is present based on first vehicle information including a task assigned to the first agent controller in the first vehicle and second vehicle information including a task assigned to a second agent controller provided with a service name the same as a name of a service provided from the first agent controller in the second vehicle. When the determiner determines that a difference is present, the transmission controller transmits particular information based on the difference between the tasks to the agent device. The first agent controller provides information on the difference between the assigned tasks based on the particular information transmitted from the transmission controller.

(26): In the aspect according to any one of (21) to (25) described above, the determiner determines whether or not a difference is present between a seventh type and an eighth type based on the seventh type of an agent controller performing processing for providing a service which is assigned with a particular task of the first vehicle and includes causing an output device to output a response of voice in response to an utterance of the user of the first vehicle acquired by the acquirer and the eighth type of an agent controller performing processing for providing a service which is assigned with a particular task of the second vehicle and includes causing an output device to output a response of voice in response to an utterance of the user of the second vehicle acquired by the acquirer. When the determiner determines that a difference is present, the transmission controller transmits particular information based on the difference between the seventh type and the eighth type to the agent device. The first agent controller provides information on the difference between the seventh type and the eighth type based on the particular information transmitted from the transmission controller.

(27): According to another aspect of the present invention, there is provided a server device including a first provider configured to generate information on a service provided from a first agent controller in accordance with information transmitted from the first agent controller performing processing for providing a service including causing an output device to output a response of voice in response to an utterance of the user of a first vehicle and information on a service provided from a second agent controller in accordance with information transmitted from the second agent controller performing processing for providing a service including causing an output device to output a response of voice in response to an utterance of the user of a second vehicle, and a second provider configured to provide information on a difference to the first vehicle when there is a difference between a service available from the first agent controller and a service available from the second agent controller based on first vehicle information on the first vehicle utilized by the user and second vehicle information on the second vehicle which has been utilized before the user utilizes the first vehicle.

(28): According to another aspect of the present invention, there is provided a method for controlling an agent device causing a computer to acquire an utterance of a user of a first vehicle. When there is a difference between a service which is utilizable in the first vehicle and is available from one or more agent controllers including at least a first agent controller and a service which is utilizable in a second vehicle and is available from one or more agent controllers, the first agent controller performing processing for providing a service including causing an output device to output a response of voice in response to the acquired utterance of the user of the first vehicle provides information on the difference.

(29): According to another aspect of the present invention, A non-transitory computer-readable storage medium that stores a computer program to be executed by a computer to perform at least; acquire an utterance of a user of a first vehicle. When there is a difference between a service which is utilizable in the first vehicle and is available from one or more agent controllers including at least a first agent controller and a service which is utilizable in a second vehicle and is available from one or more agent controllers, the first agent controller performing processing for providing a service including causing an output device to output a response of voice in response to the acquired utterance of the user of the first vehicle provides information on the difference.

According to (1) to (26), (28), and (29), when there is a difference between a service usable in the first vehicle and a service usable in the second vehicle, the first agent controller provides information on the difference. Therefore, satisfaction of the user is improved.

According to (27), when there is a difference between a service usable in the first vehicle and a service usable in the second vehicle, the server device can support provision of information on the difference. Therefore, it is possible to contribute to improvement in satisfaction of the user.

BRIEF DESCRIPTION OF THE DRAWINGS

FIG. 11 is a view showing an example of details of historical information.

FIG. 12 is a flowchart showing an example of a flow of processing executed by a general-purpose communication device and the information processing server.

FIG. 13 is a view showing an example of reservation management information.

DETAILED DESCRIPTION

Hereinafter, with reference to the drawings, embodiments of an agent device, an agent system, a server device, a method for controlling an agent device, and a storage medium of the present invention will be described.

First Embodiment

The agent device is a device realizing part or the entirety of the agent system.

Hereinafter, as an example of the agent device, an agent device which is mounted in a vehicle (hereinafter, a first vehicle M1 or a second vehicle M2) and has agent functions of a plurality of kinds will be described. When the first vehicle M1 and the second vehicle M2 are not distinguished from each other, there are cases in which the first vehicle M1 or the second vehicle M2 is referred to as a vehicle M.

For example, the agent function is a function for providing various kinds of information based on a request (command) included in an utterance of a user through an interaction with the user of the vehicle M or relaying a network service. Agents of a plurality of kinds may differ from each other in performing function, processing procedure, control, output form/details. Regarding an agent function, some agents may have a function of controlling or the like of instruments (for example, instruments related to driving control and vehicle body control) inside the vehicle.

The agent functions are realized integrally utilizing a natural language processing function (a function of understanding the structure and the meaning of a text), an interaction management function, and a network searching function of searching for other devices via a network or searching for a predetermined database retained by a host device, for example, in addition to a voice recognition function (a function of converting a voice into a text) of recognizing voice of the user. Some or all of the functions may be realized by an artificial intelligence (AI) technology. Part (particularly, the voice recognition function and a natural language processing interpretation function) of the configuration for performing the functions may be mounted in an agent server (external device) which can communicate with an in-vehicle communication device of the vehicle M or a general-purpose communication device carried into the vehicle M. The following description will be given on the premise that part of the configuration is mounted in the agent server and the agent device and the agent server realize the agent system in cooperation with each other. A service providing entity (service entity) which is virtually realized by the agent device and the agent server in cooperation with each other will be referred to as an agent.

<Overall Configuration>

Figure 1:
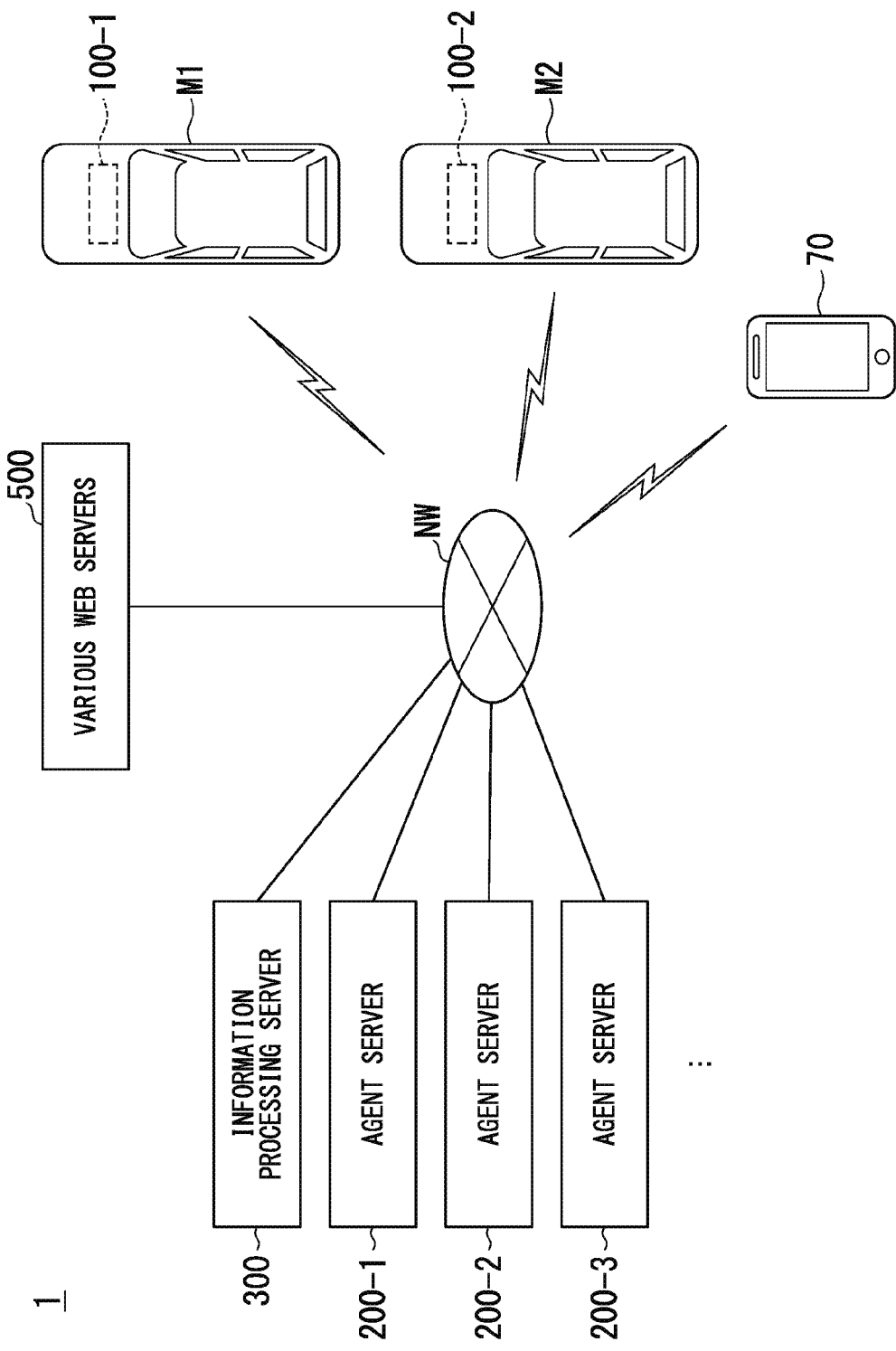
FIG. 1 is a view of a configuration of an agent system including agent devices 100.

FIG. 1 is a view of a configuration of an agent system 1 including agent devices 100. For example, the agent system 1 includes a general-purpose communication device 70, agent devices 100-1 and 100-2, a plurality of agent servers 200-1, 200-2, 200-3, and so on, and an information processing server 300. When the agent devices 100-1 and 100-2 are not distinguished from each other, there are cases in which the agent device 100-1 or 100-2 is simply referred to as an agent device 100. A number after the hyphen at the end of the reference sign of the agent server 200 is an identifier for distinguishing the agent. When the agent servers are not distinguished from each other, there are cases in which the agent server is simply referred to as an agent server 200. In FIG. 1, three agent servers 200 are shown, but the number of agent servers 200 may be two, four, or more.

The agent servers 200 are operated by providers of the respective agent systems different from each other. Therefore, the agents in the present invention are agents realized by providers different from each other. Examples of the providers include automobile manufacturers, network service companies, electronic commerce companies, and vendors of portable terminals, and arbitrary entities (corporations, organizations, individuals, and the like) may serve as a provider of the agent system.

The agent device 100 communicates with the agent server 200 via a network NW. Examples of the network NW include some or all of the Internet, a cellular network, a Wi-Fi network, a wide area network (WAN), a local area network (LAN), a public line, a telephone line, and a radio base station. Various Web servers 500 are connected to the network NW, and the agent server 200 or the agent device 100 can acquire Web pages from the various Web servers 500 via the network NW.

The agent device 100 interacts with the user of the vehicle M, transmits voice from the user to the agent server 200, and presents a response obtained from the agent server 200 to the user in a form of an output voice or an image display.

[Vehicle]

Figure 2:
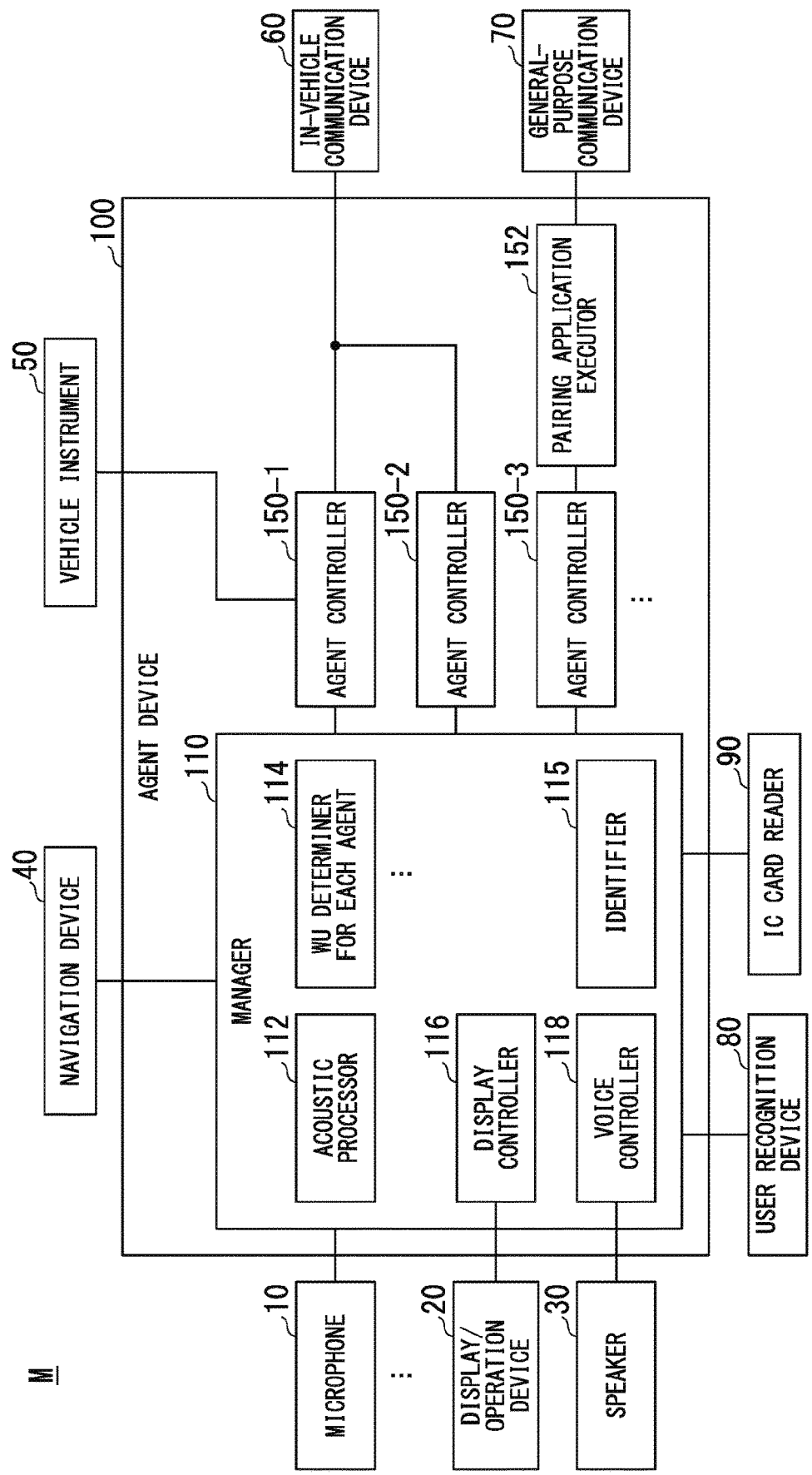
FIG. 2 is a view showing a configuration of the agent device according to a first embodiment and instruments mounted in a vehicle.

FIG. 2 is a view showing a configuration of the agent device 100 according to a first embodiment and instruments mounted in the vehicle M. For example, one or more microphones 10, a display/operation device 20, speakers 30, a navigation device 40, a vehicle instrument 50, an in-vehicle communication device 60, a user recognition device 80, an IC card reader 90, and the agent device 100 are mounted in the vehicle M. There are cases in which the general-purpose communication device 70, such as a smartphone, is carried into a vehicle cabin and is used as a communication device. The devices are connected to each other through a multiplex communication line (a controller area network (CAN) communication line or the like), a serial communication line, a radio communication network, or the like. The configuration shown in FIG. 2 is merely an example. Part of the configuration may be omitted, or a different configuration may be added further.

The microphone 10 is a sound collector collecting voice emitted inside the vehicle cabin. The display/operation device 20 is a device (or a device group) capable of displaying an image and receiving an input operation. For example, the display/operation device 20 includes a display device configured as a touch panel. The display/operation device 20 may further include a head up display (HUD) or a mechanical input device. For example, the speakers 30 include a plurality of speakers (sound output devices) arranged at positions different from each other inside the vehicle cabin. The display/operation device 20 may be shared between the agent device 100 and the navigation device 40. These will be described below in detail.

The navigation device 40 includes a navigation human machine interface (HMI), a positioning device such as a global positioning system (GPS), a storage device storing map information, and a control device (navigation controller) performing route searching or the like. Some or all of the microphone 10, the display/operation device 20, and the speakers 30 may be used as the navigation HMI. The navigation device 40 searches for a route (navigation route) to move from the position of the vehicle M identified by the positioning device to a destination input by the user and outputs guidance information using the navigation HMI such that the vehicle M can travel along the route. The route searching function may be provided in a navigation server which is accessible via the network NW. In this case, the navigation device 40 acquires a route from the navigation server and outputs guidance information. The agent device 100 may be established on the basis of the navigation controller. In such a case, the navigation controller and the agent device 100 are configured integrally in respect of hardware.

For example, the vehicle instrument 50 includes driving force output devices such as an engine and a motor for traveling; a starting motor for the engine; a door lock device and door opening/closing devices; windows, window opening/closing devices, and window opening/closing control devices; seats and control devices for seat positions; a rearview mirror and a control device for an angular position thereof; lighting devices inside and outside the vehicle, and a control device thereof; wipers, defoggers, and control devices for both thereof; direction indicator lamps and a control device thereof; an air-conditioning device; a vehicle information device for information on a mileage and air pressures of tires, and for residual quantity information on fuel; and the like.

For example, the in-vehicle communication device 60 is a radio communication device which is accessible to the network NW utilizing a cellular network or a Wi-Fi network.

For example, the user recognition device 80 includes seat sensors, an in-cabin camera, an image recognition device, and the like. The seat sensors include pressure sensors provided under the seats, tension sensors attached to seatbelts, and the like. The in-cabin camera is a charge coupled device (CCD) camera or a complementary metal oxide semiconductor (CMOS) camera provided inside the vehicle cabin. The image recognition device analyzes images captured by the in-cabin camera and recognizes the presence or absence of a user at each seat, orientation of the face, and the like.

For example, the user recognition device 80 identifies users using particular images captured by the in-cabin camera. For example, the user recognition device 80 extracts feature quantities of users from particular images, compares a distribution of the extracted feature quantities and a distribution of feature quantities stored in reference information, and acquires a distribution of feature quantities matching the distribution of the extracted feature quantities from the reference information. Further, the user recognition device 80 identifies users by acquiring identification information associated with the acquired distribution of feature quantities from the reference information.

For example, the feature quantity is information based on a luminance value or a luminance gradient extracted from particular images. For example, the reference information is stored in a storage device (not shown in the diagram). The reference information is information in which distributions of feature quantities and identification information are associated with each other. The user may cause the user recognition device 80 to identify the user by performing a predetermined operation with respect to the display/operation device 20 or the speakers 30. Example of a predetermined operation include an operation of inputting identification information of users and an operation of inputting predetermined voices.

The IC card reader 90 includes a communicator, an information processor, and the like. When the user holds an IC card over a predetermined presentation surface, the communicator communicates with the IC card. The information processor acquires IC card identification information stored in a storage of the IC card from information acquired by the communicator and provides the acquired information to a manager 110.

Figure 3:
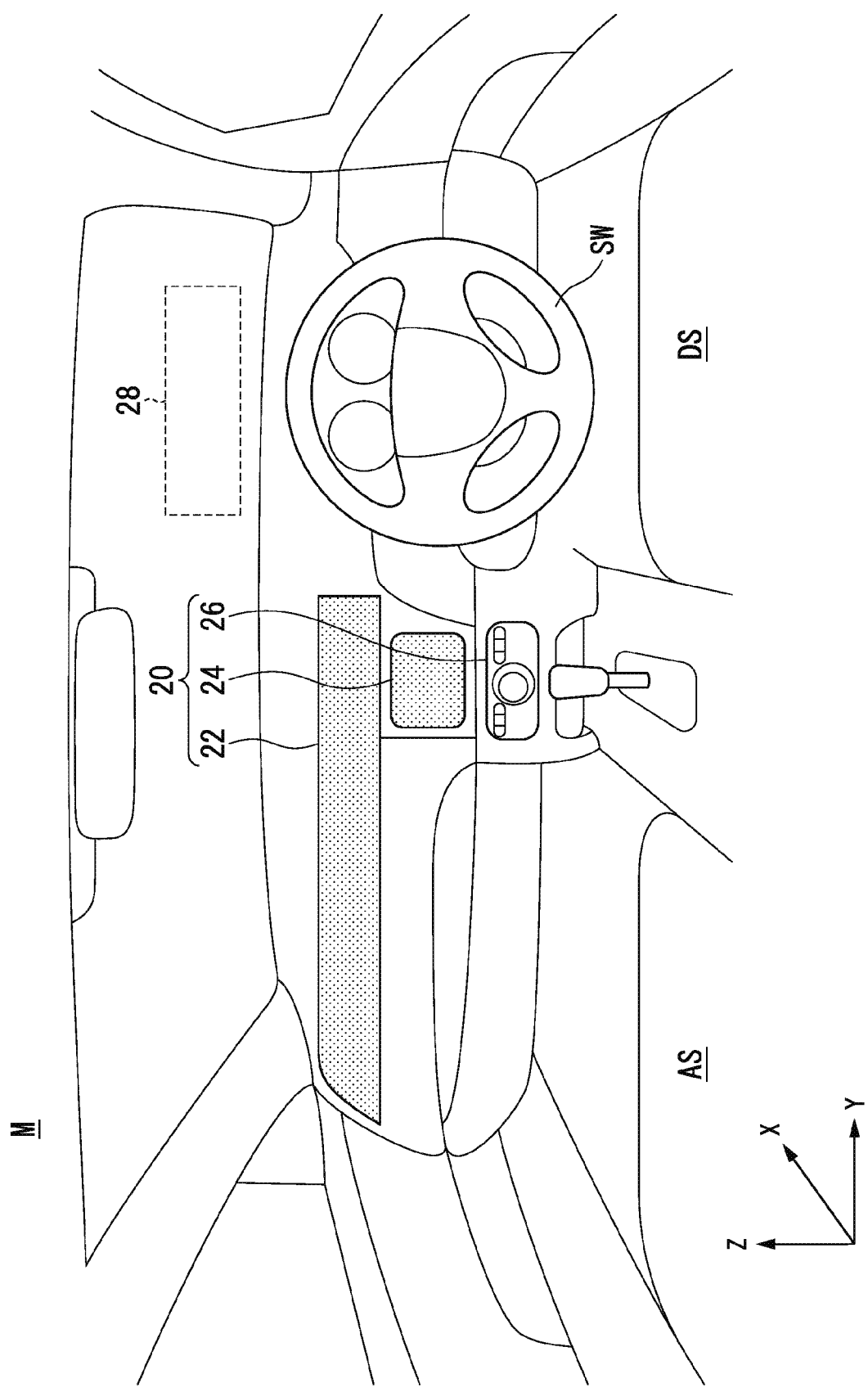
FIG. 3 is a view showing a disposition example of a display/operation device.

FIG. 3 is a view showing a disposition example of the display/operation device 20. For example, the display/operation device 20 includes a first display 22, a second display 24, and an operation switch assembly 26. The display/operation device 20 may further include an HUD 28.

For example, in the vehicle M, a driver's seat DS in which a steering wheel SW is provided, and an assistant driver's seat AS provided next to the driver's seat DS in a vehicle width direction (Y direction in the diagram) are present. The first display 22 is a display device having a horizontally elongated shape extending from approximately between the driver's seat DS and the assistant driver's seat AS in an instrument panel to a position facing the left end part of the assistant driver's seat AS.

The second display 24 is installed approximately between the driver's seat DS and the assistant driver's seat AS in the vehicle width direction and below the first display 22. For example, both the first display 22 and the second display 24 are configured as touch panels and include a liquid crystal display (LCD), an organic electroluminescence (EL), a plasma display, or the like as a display. The operation switch assembly 26 is a cluster of dial switches, button switches, and the like. The display/operation device 20 outputs details of an operation performed by the user to the agent device 100. The agent device 100 may determine the details to be displayed by the first display 22 or the second display 24.

Figure 4:
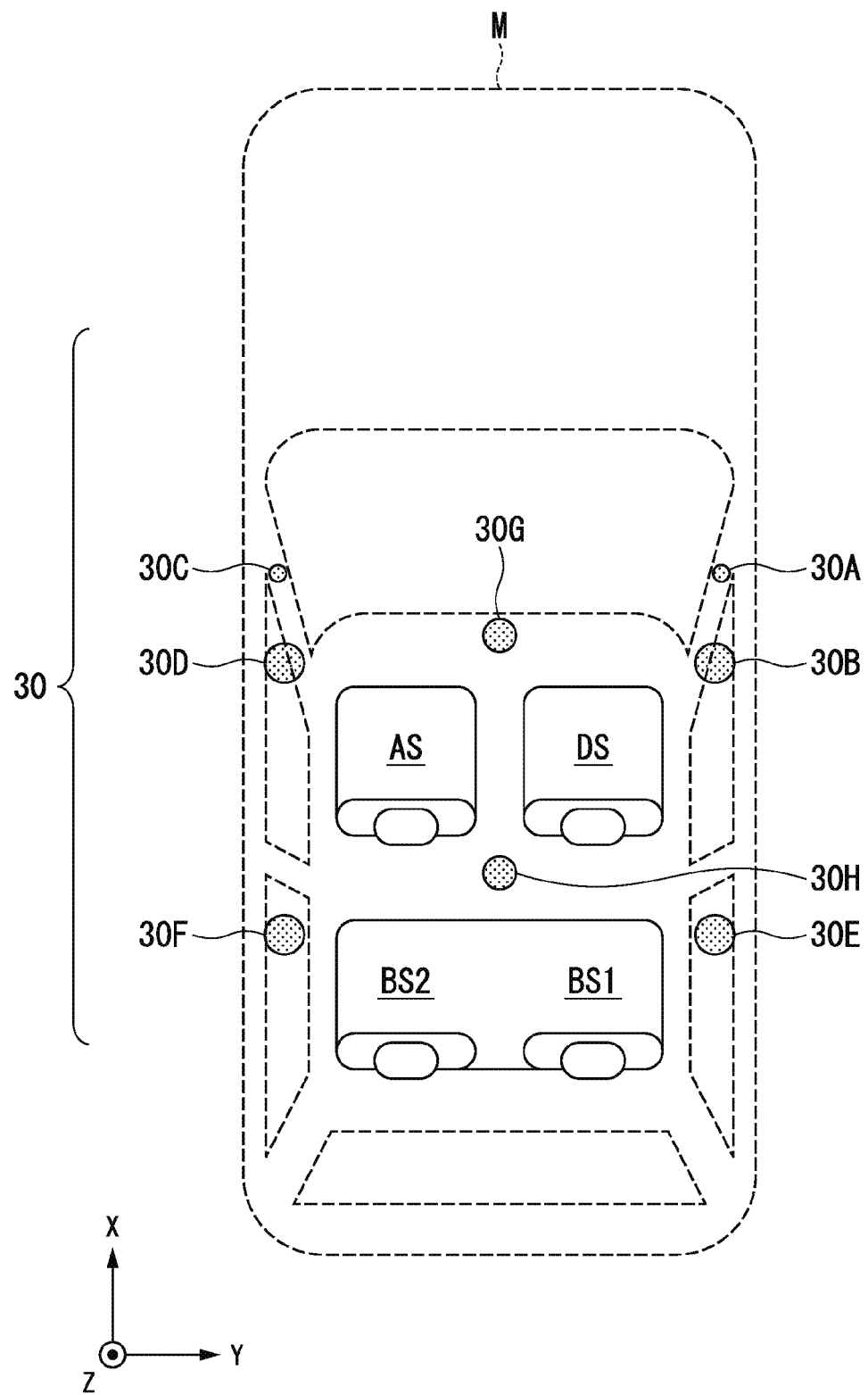
FIG. 4 is a view showing a disposition example of speakers.

FIG. 4 is a view showing a disposition example of the speakers 30. For example, the speakers 30 include speakers 30A to 30H. The speaker 30A is installed in a window pillar (a so-called A-pillar) on the driver's seat DS side. The speaker 30B is installed in a lower part of a door near the driver's seat DS. The speaker 30C is installed in a window pillar on the assistant driver's seat AS side. The speaker 30D is installed in a lower part of a door near the assistant driver's seat AS. The speaker 30E is installed in a lower part of a door near a rear right seat BS1 side. The speaker 30F is installed in a lower part of a door near a rear left seat BS2 side. The speaker 30G is installed in the vicinity of the second display 24. The speaker 30H is installed in a ceiling (roof) of the cabin.

For example, regarding the disposition, when a sound is output exclusively from the speakers 30A and 30B, a sound image is localized in the vicinity of the driver's seat DS. When a sound is output exclusively from the speakers 30C and 30D, a sound image is localized in the vicinity of the assistant driver's seat AS. When a sound is output exclusively from the speaker 30E, a sound image is localized in the vicinity of the rear right seat BS1. In addition, when a sound is output exclusively from the speaker 30F, a sound image is localized in the vicinity of the rear left seat BS2. When a sound is output exclusively from the speaker 30G, a sound image is localized in the vicinity of the front of the cabin, and when a sound is output exclusively from the speaker 30H, a sound image is localized in the vicinity of an upper part of the cabin. The speakers 30 are not limited to this disposition, and a sound image can be localized at an arbitrary position inside the vehicle cabin by adjusting the distribution of sounds output from each of the speakers using a mixer or an amplifier.

[Agent Device]

Returning to FIG. 2, the agent device 100 includes the manager 110, agent controllers 150-1, 150-2, and 150-3, and a pairing application executor 152. For example, the manager 110 includes an acoustic processor 112, a wake-up (WU) determiner 114 for each agent, an identifier 115, a display controller 116, and a voice controller 118. When the agent controllers are not distinguished from each other, the agent controller will be simply referred to as an agent controller 150. Three agent controllers 150 shown in the diagram are merely an example associated with the number of agent servers 200 in FIG. 1. The number of agent controllers 150 may be two, four, or more. The disposition of software shown in FIG. 2 is shown simply for the sake of description. For example, in practice, the manager 110 may be interposed between the agent controller 150 and the in-vehicle communication device 60, and the disposition can be modified and changed arbitrarily.

For example, each of the constituent elements of the agent device 100 is realized by a hardware processor such as a central processing unit (CPU) executing a program (software). Some or all of the constituent elements may be realized by hardware (a circuit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device having a non-transitory storage medium) such as a hard disk drive (HDD) or a flash memory in advance or may be stored in an attachable/detachable storage medium (non-transitory storage medium) such as a DVD or a CD-ROM such that the program is installed when the storage medium is mounted in a drive device.

The manager 110 functions when a program such as an operating system (OS) or middleware is executed.

The acoustic processor 112 of the manager 110 performs acoustic processing with respect to an input sound to realize a state suitable for recognizing wake-up words set for each agent in advance.

The WU determiner 114 for each agent is present associated with each of the agent controllers 150-1, 150-2, and 150-3 and recognizes the wake-up words set for each agent in advance. The WU determiner 114 for each agent recognizes the meaning of voice from a voice (voice stream) subjected to acoustic processing. First, the WU determiner 114 for each agent detects a voice section based on the amplitude and the zero crossing of a voice waveform in a voice stream. The WU determiner 114 for each agent may perform sectional detection based on voice identification and non-voice identification in frame units based on a Gaussian mixture model (GMM).

Next, the WU determiner 114 for each agent converts a voice in a detected voice section into a text for text information. Further, the WU determiner 114 for each agent determines whether or not text information (converted text) corresponds to (associates with) a wake-up word. When it is determined that text information corresponds to (associates with) a wake-up word, the WU determiner 114 for each agent starts the corresponding (associated) agent controller 150. A function associated with the WU determiner 114 for each agent may be mounted in the agent server 200. In this case, the manager 110 transmits a voice stream subjected to acoustic processing by the acoustic processor 112 to the agent server 200. When the agent server 200 determines that the transmitted voice stream corresponds to a wake-up word, the agent controller 150 starts in accordance with an instruction from the agent server 200. Each of the agent controllers 150 may be in operation at all times and may perform determination of a wake-up word by itself. In this case, there is no need for the manager 110 to include the WU determiner 114 for each agent.

The agent controller 150 realizes an agent in cooperation with the corresponding (associated) agent server 200 and provides a service including causing an output device to output a response of voice in response to an utterance of the user of the vehicle M. The agent controllers 150 may include an agent controller having authority to control the vehicle instrument 50. The agent controller 150 may be associated with the general-purpose communication device 70 via the pairing application executor 152 and may communicate with the agent server 200. For example, the agent controller 150-1 has authority to control the vehicle instrument 50. The agent controller 150-1 communicates with the agent server 200-1 via the in-vehicle communication device 60. The agent controller 150-2 communicates with the agent server 200-2 via the in-vehicle communication device 60. The agent controller 150-3 is associated with the general-purpose communication device 70 via the pairing application executor 152 and communicates with the agent server 200-3.

For example, the pairing application executor 152 performs pairing with the general-purpose communication device 70 through Bluetooth (registered trademark) and connects the agent controller 150-3 and the general-purpose communication device 70 to each other. The agent controller 150-3 may be connected to the general-purpose communication device 70 through wired communication utilizing a universal serial bus (USB) or the like. Hereinafter, there are cases in which an agent realized in cooperation between the agent controller 150-1 and the agent server 200-1 is referred to as an agent 1, an agent realized in cooperation between the agent controller 150-2 and the agent server 200-2 is referred to as an agent 2, and an agent realized in cooperation between the agent controller 150-3 and the agent server 200-3 is referred to as an agent 3.

The identifier 115 determines whether or not to allow the user to utilize the vehicle M based on information acquired by the IC card reader 90 and information transmitted from the information processing server 300.

The display controller 116 causes the first display 22 or the second display 24 to display an image in accordance with an instruction of the agent controller 150. Hereinafter, the first display 22 will be used. Due to control of some agent controllers 150, for example, the display controller 116 generates an image of an agent (which will hereinafter be referred to as an agent image) which is personified and performs communication with the user inside the vehicle cabin, and the display controller 116 causes the first display 22 to display the generated agent image. For example, an agent image is an image in a form of speaking to the user. For example, an agent image may include a facial image to the extent that a facial expression or orientation of the face is recognized by at least a viewer (user). For example, in an agent image, parts imitating eyes and a nose may be expressed in a facial area, and a facial expression or orientation of the face may be recognized based on positions of the parts in the facial area. An agent image is an image which is perceived three-dimensionally by a viewer and in which orientation of the face of an agent is recognized due to an included head image in a three-dimensional space. An agent image may be an image in which movements, a behavior, a posture, and the like of an agent are recognized and which includes an image of a main body (the body or limbs). An agent image may be an animation image.

The voice controller 118 causes some or all of the speakers included in the speakers 30 to output voices in accordance with an instruction of the agent controller 150. The voice controller 118 may perform control in which a sound image of an agent voice is localized at a position associated with a display position of an agent image using the plurality of speakers 30. For example, a position associated with a display position of an agent image is an expected position where the user feels that an agent image talks with an agent voice and is specifically a position in the vicinity (for example, within 2 to 3 [cm]) of a display position of an agent image. For example, localization of a sound image denotes that a spatial position of a sound source which the user feels is set through adjustment of the loudness of sounds transferred to the right and left ears of the user.

Figure 5:
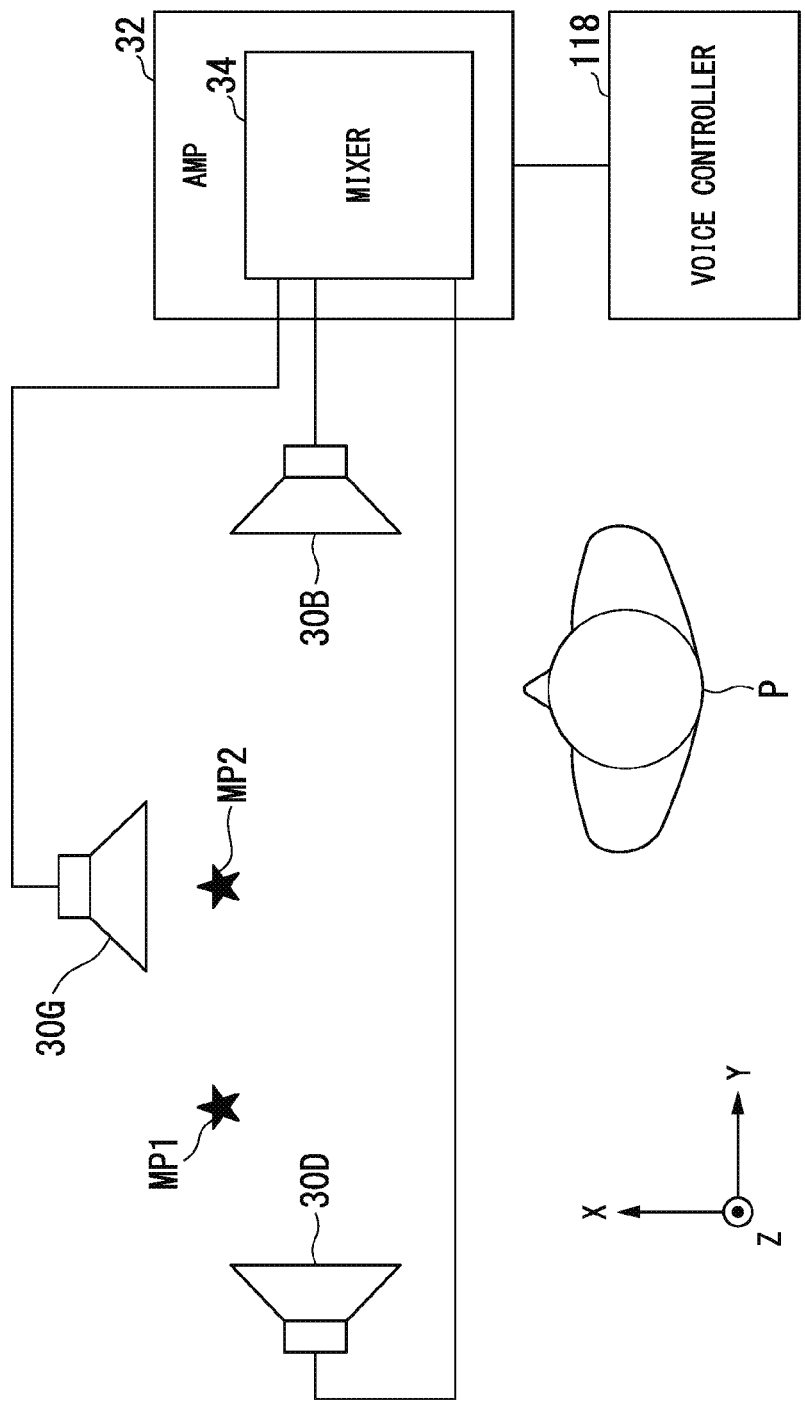
FIG. 5 is a view for describing a principle of setting a position where a sound image is localized.

FIG. 5 is a view for describing a principle of setting a position where a sound image is localized. In FIG. 5, for the sake of simplification of description, an example using the speakers 30B, 30D, and 30G described above is shown, but arbitrary speakers included in the speakers 30 may be used. The voice controller 118 controls an amplifier (AMP) 32 and a mixer 34 connected to each of the speakers such that a sound image is localized. For example, when a sound image is localized at a spatial position MP1 shown in FIG. 5, the voice controller 118 controls the amplifier 32 and the mixer 34 such that the speaker 30B outputs 5% of a maximum intensity, the speaker 30D outputs 80% of the maximum intensity, and the speaker 30G outputs 15% of the maximum intensity. As a result, a user P feels that a sound image is localized at the spatial position MP1 shown in FIG. 5 from the position of the user P.

When a sound image is localized at a spatial position MP2 shown in FIG. 5, the voice controller 118 controls the amplifier 32 and the mixer 34 such that the speaker 30B outputs 45% of the maximum intensity, the speaker 30D outputs 45% of the maximum intensity, and the speaker 30G outputs 45% of the maximum intensity. As a result, the user P feels that a sound image is localized at the spatial position MP2 shown in FIG. 5 from the position of the user P. In this manner, a position where a sound image is localized can be changed by adjusting the plurality of speakers provided inside the vehicle cabin and the loudness of sound output from each of the speakers. More specifically, a position where a sound image is localized is set based on sound characteristics which a sound source inherently retains, information of the environment inside the vehicle cabin, and a head-related transfer function (HRTF). Accordingly, the voice controller 118 localizes a sound image at a predetermined position by controlling the speakers 30 with an optimum distribution which has been acquired in advance through a sensory test or the like.

[Agent Server]

Figure 6:
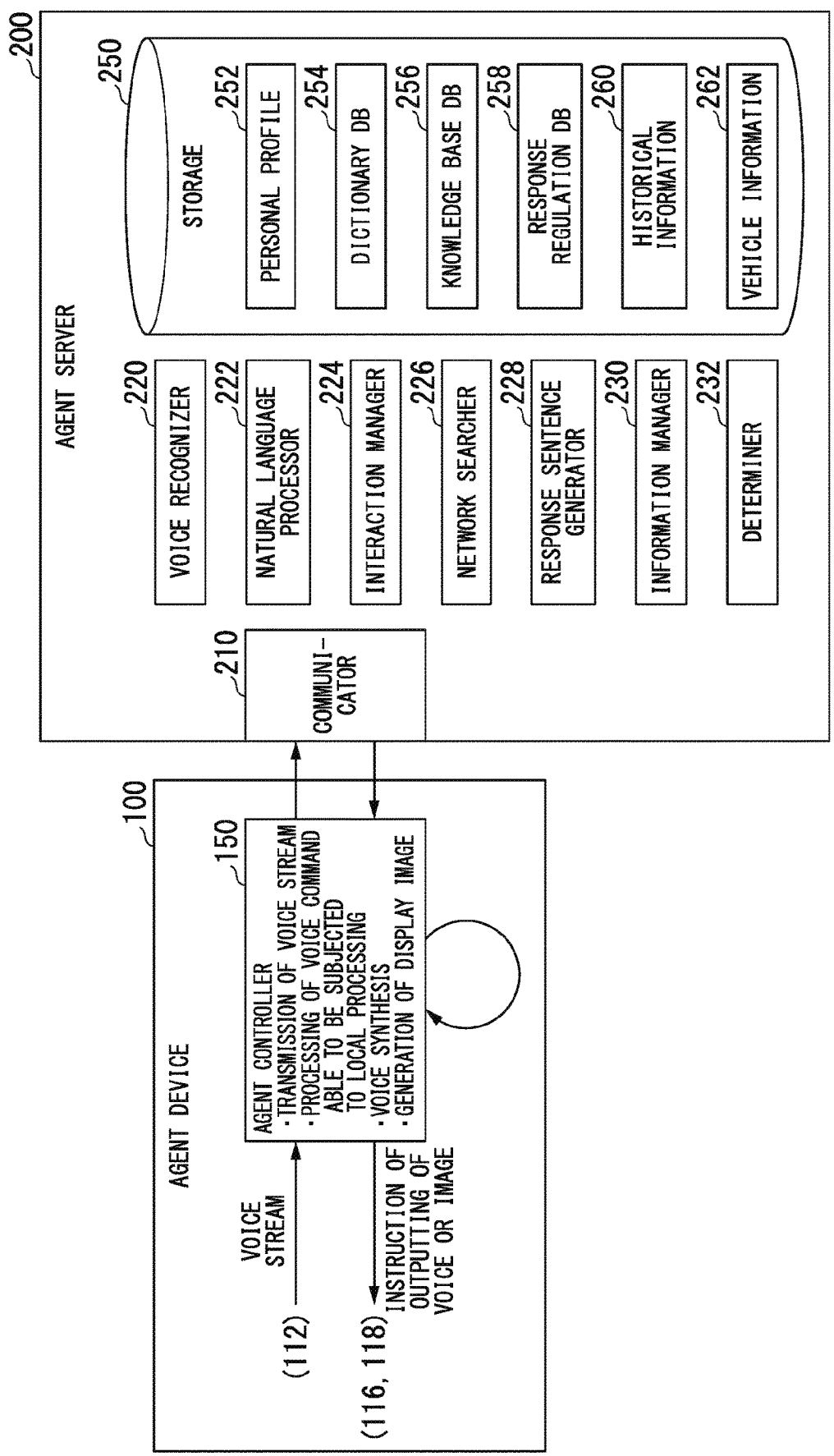
FIG. 6 is a view showing a configuration of an agent server and part of a configuration of the agent device.

FIG. 6 is a view showing a configuration of the agent server 200 and part of a configuration of the agent device 100. Hereinafter, operation of the agent controller 150 and the like will be described together with a configuration of the agent server 200. Here, description regarding physical communication from the agent device 100 to the network NW will be omitted.

The agent server 200 includes a communicator 210. For example, the communicator 210 is a network interface such as a network interface card (NIC). For example, the agent server 200 further includes a voice recognizer 220, a natural language processor 222, an interaction manager 224, a network searcher 226, a response sentence generator 228, an information manager 230, and a determiner 232. For example, the constituent elements are realized when a hardware processor such as a CPU executes a program (software). Some or all of the constituent elements may be realized by hardware (a circuit; including circuitry) such as an LSI, an ASIC, an FPGA, or a GPU or may be realized by software and hardware in cooperation. The program may be stored in a storage device (a storage device having a non-transitory storage medium) such as an HDD or a flash memory in advance or may be stored in an attachable/detachable storage medium (non-transitory storage medium) such as a DVD or a CD-ROM such that the program is installed when the storage medium is mounted in a drive device.

The agent server 200 includes a storage 250. The storage 250 is realized by the various storage devices described above. The storage 250 stores data such as a personal profile 252, a dictionary database (DB) 254, a knowledge base DB 256, a response regulation DB 258, historical information 260, and vehicle information 262; and a program. The historical information 260 and the vehicle information 262 will be described below in detail.

In the agent device 100, the agent controller 150 transmits a voice stream or a voice stream subjected to processing such as compression or encoding to the agent server 200. When a voice command which can be subjected to local processing (processing without involving the agent server 200) is recognized, the agent controller 150 may perform processing requested by the voice command. A voice command which can be subjected to local processing is a voice command which can be responded with reference to a storage (not shown in the diagram) included in the agent device 100 or a voice command for controlling the vehicle instrument 50 (for example, a command for turning on the air-conditioning device, or the like) in the case of the agent controller 150-1. Therefore, the agent controller 150 may have some of the functions provided in the agent server 200.

When a voice stream is acquired, the agent device 100 outputs text information which has been converted into a text by the voice recognizer 220 through voice recognition, and the natural language processor 222 interprets the meaning of the text information with reference to the dictionary DB 254. In the dictionary DB 254, abstracted meaning information is associated with text information. The dictionary DB 254 may include list information of synonyms or near-synonyms. The processing of the voice recognizer 220 and the processing of the natural language processor 222 are not distinctly divided into stages and may be performed while affecting each other. For example, the voice recognizer 220 may revise a result of recognition upon reception of a result of processing of the natural language processor 222.

For example, when a meaning such as "HOW IS THE WEATHER TODAY?" or "HOW IS THE WEATHER?" is recognized as a result of recognition, the natural language processor 222 generates a command replaced with "TODAY'S WEATHER" which is standard text information. Accordingly, even when a voice of a request has a text variation, a requested interaction can be easily performed. For example, the natural language processor 222 may recognize the meaning of the text information using artificial intelligence processing such as machine learning processing utilizing probability or may generate a command based on a result of recognition.

The interaction manager 224 determines details of an utterance with respect to the user of the vehicle M with reference to the personal profile 252, the knowledge base DB 256, and the response regulation DB 258 based on a result (command) of processing of the natural language processor 222. The personal profile 252 includes individual information, interests/preferences, past history of interactions, and the like of users retained for each of users. The knowledge base DB 256 is information in which relationships of matters are regulated. The response regulation DB 258 is information in which operation (a response, details of instrument control, or the like) to be performed by an agent with respect to a command is regulated.

The interaction manager 224 may identify the user by making an inquiry to the personal profile 252 using feature information obtained from a voice stream. In this case, for example, in the personal profile 252, the individual information is associated with the feature information of a voice. For example, the feature information of a voice is information on the feature quantities based on features of a way of talking, such as a voice pitch, an intonation, and a rhythm (a pattern of a voice pitch); mel frequency cepstrum coefficients; and the like. For example, the feature information of a voice is information obtained by causing the user to speak predetermined words, sentences, or the like at the time of initial registration of the user and recognizing the spoken voice.

When a command requests information which is searchable via the network NW, the interaction manager 224 causes the network searcher 226 to perform searching. The network searcher 226 accesses the various Web servers 500 via the network NW and acquires desired information. For example, "information which is searchable via the network NW" may be a result of evaluation made by general users of a restaurant around the vehicle M or may be a weather forecast at the position of the vehicle M of the day.

The response sentence generator 228 generates a response sentence such that details of an utterance determined by the interaction manager 224 is transferred to the user of the vehicle M and transmits the generated response sentence to the agent device 100. When it is identified that the user is a user registered in a personal profile, the response sentence generator 228 may call the user's name or may generate a response sentence in a way of talking similar to the way the user talks. When the interaction manager 224 determines to provide music to the user, processing of the response sentence generator 228 is omitted, and information of a piece of music obtained based on a searching result of the network searcher 226 is provided to the agent controller 150. Hereinafter, when a response sentence and information such as a piece of music provided to the user are not distinguished from each other, there are cases in which they are referred to as "response information".

When a response sentence is acquired, the agent controller 150 instructs the voice controller 118 to perform voice synthesis and output a voice. The agent controller 150 instructs the display controller 116 to display an image of an agent in accordance with the output of a voice. In this manner, the agent function in which a virtually-realized agent responds to the user of the vehicle M is realized.

The information manager 230 manages information acquired by the agent device 100 and information provided to the agent device 100 by the host device. The information manager 230 manages information transmitted from the vehicle M or manages information transmitted to the vehicle M. For example, the information manager 230 transmits a result of determination of the determiner 232 to the agent device 100.

The determiner 232 determines whether or not a difference is present between a service available from (usable in, applicable to) the agent controller 150 of the first vehicle M1 and a service available from the agent controller 150 of the second vehicle M2 based on first vehicle information on the first vehicle M1 in which the user is on board and second vehicle information on the second vehicle M2 which has been utilized before the user utilizes the first vehicle M1 in accordance with information transmitted from the agent device 100. This processing will be described below in detail.

[Processing of Agent Server]

Figure 7:
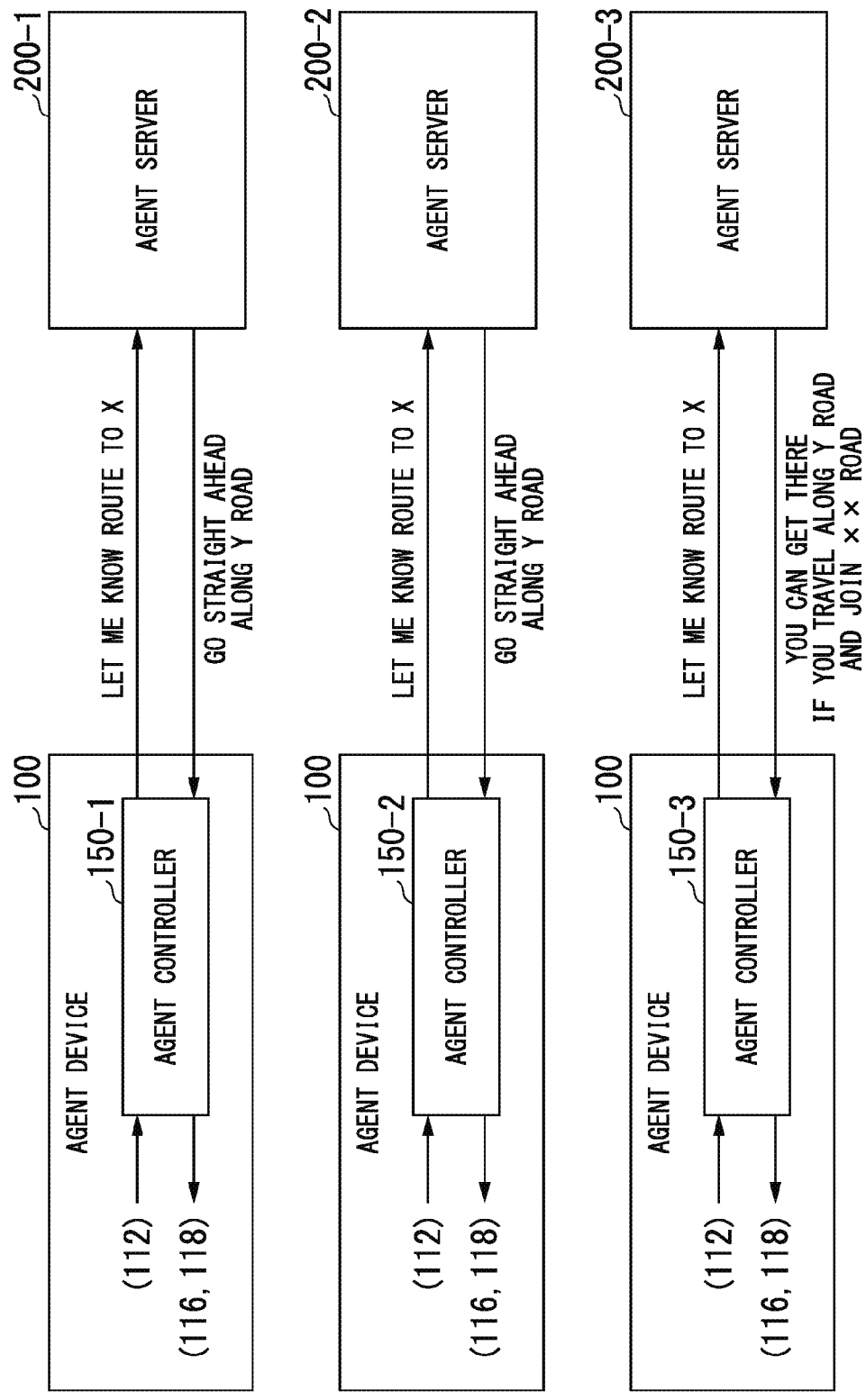
FIG. 7 is a view for describing an overview of response information provided to the agent server.

FIG. 7 is a view for describing an overview of response information provided to the agent server 200. The agent servers 200-1, 200-2, and 200-3 have configurations of a basic function and details of processing equivalent to each other. However, there are cases in which pieces of information, algorithms used by functional sections in processing, or the like thereof differ from each other. Therefore, when the user inputs a predetermined utterance to the agent server 200 via the agent device 100, there are cases in which the details of response information provided to the agent device 100 by the agent server 200 are the same as each other, are similar to each other, or are different from each other.

For example, even if the algorithms utilized by the respective agent servers 200 are similar to each other, when there is a difference between the pieces of information stored in the storages 250 of the respective agent servers 200, the agent servers 200 may have different response information. For example, even if the pieces of information stored in the storages 250 of the respective agent servers 200 are the same as each other, when there is a difference between the algorithms utilized by the agent servers 200, the agent servers 200 may have different response information.

For example, as shown in FIG. 7, when the user inquires of the agent controllers 150-1 to 150-3 "LET ME KNOW A ROUTE TO X", the agent controllers 150-1 and 150-2 may give the same response and the agent controller 150-3 may give a response different from those of other agent controllers.

As described above, a service to be provided may differ depending on the type or the characteristics of the agent controller 150 mounted in the vehicle M. For example, if agents mounted in the first vehicle M1 and the second vehicle M2 are different from each other, a service to be provided differs.

In the following processing, description will be given with an example in which the second vehicle M2 is a private vehicle and the first vehicle M1 is a vehicle M utilized in a car-sharing service. For example, the first vehicle M1 may be a rental car or a vehicle M owned by someone other than the user.

[Processing of Information Management Device]

Figure 8:
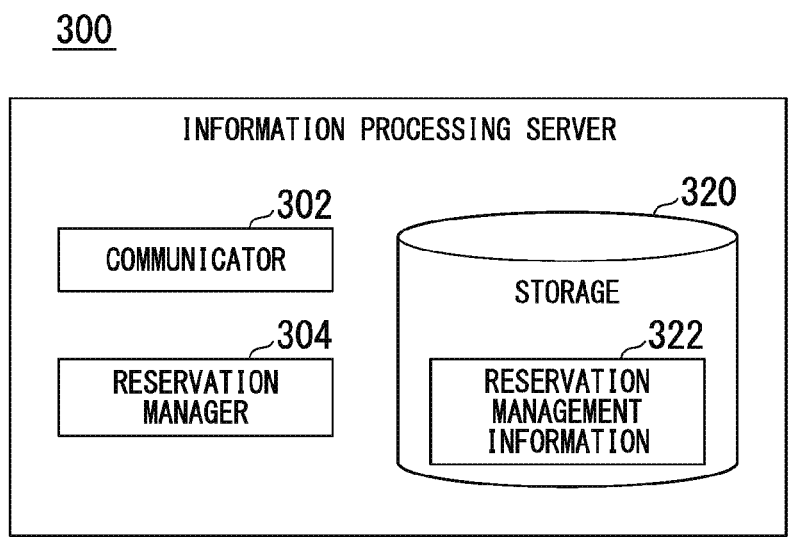
FIG. 8 is a view showing an example of a configuration of a function of an information processing server.

FIG. 8 is a view showing an example of a configuration of a function of the information processing server 300. For example, the information processing server 300 includes a communicator 302, a reservation manager 304, and a storage 320. The communicator 302 is a communication interface for communication with the general-purpose communication device 70, the vehicle M, the agent server 200, and the like. The reservation manager 304 makes a reservation regarding utilization of the vehicle M based on information transmitted from the general-purpose communication device 70. For example, the storage 320 stores reservation management information 322. The reservation management information 322 will be described below in detail.

[Overview of Particular Processing]

Figure 9:
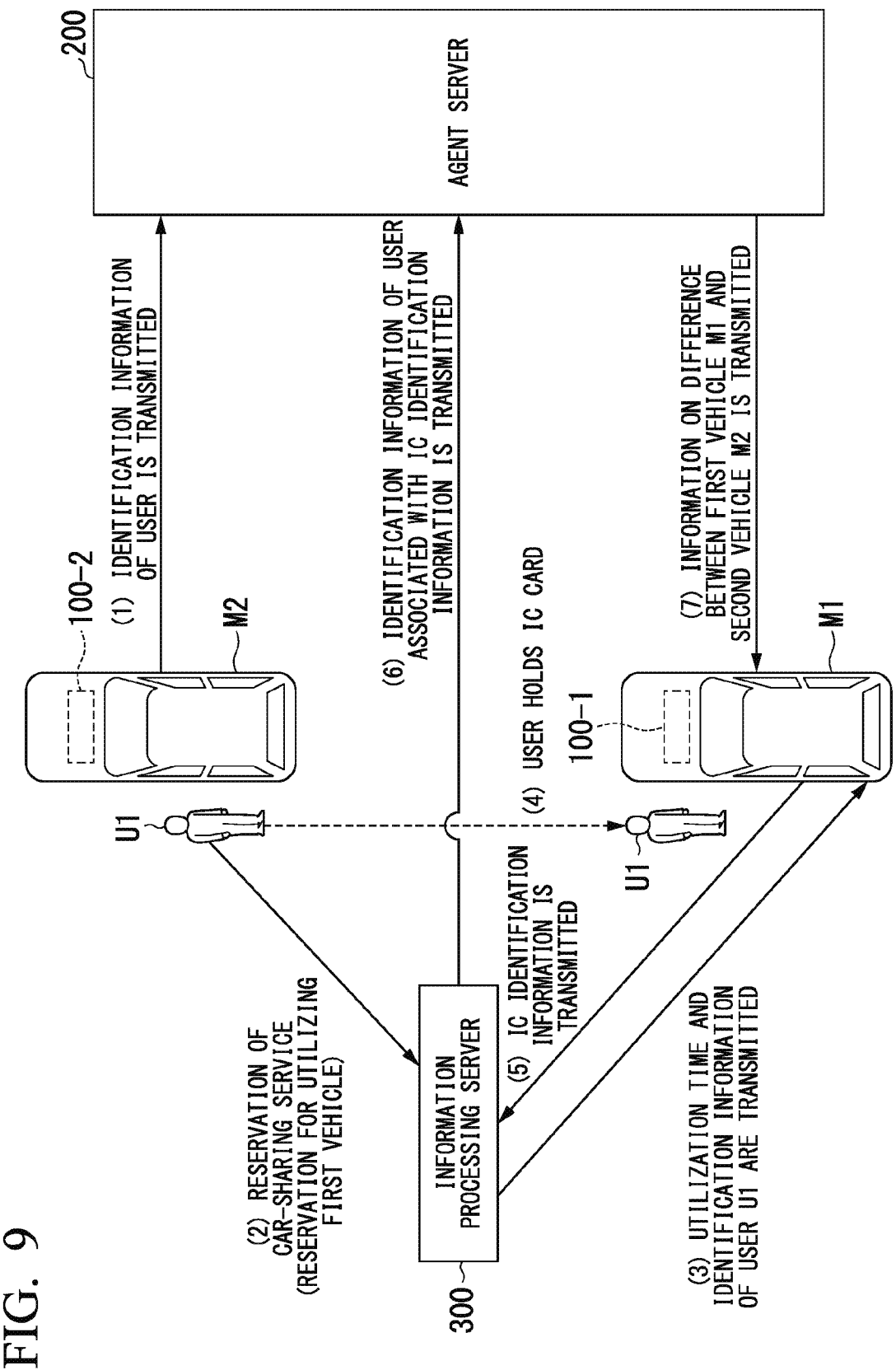
FIG. 9 is a view for describing an overview of particular processing.

FIG. 9 is a view for describing an overview of particular processing. (1) The second vehicle M2 transmits identification information of a user U1 utilizing the second vehicle M2 to the agent server 200. (2) After the second vehicle M2 is utilized, the user U1 makes a reservation of a car-sharing service using the identification information of the user U1 (makes a reservation for utilizing the first vehicle M1). Accordingly, the information processing server 300 makes a reservation for the first vehicle M1. (3) The information processing server 300 transmits the utilization time at which the user U1 will utilize the first vehicle M1 and the identification information of the user U1 to the first vehicle M1.

(4) Next, when the user U1 holds the IC card, which has been provided in advance, over the IC card reader 90 of the first vehicle M1, the first vehicle M1 performs authentication of the user U1 and allows the user U1 to utilize the first vehicle M1. (5) Next, the first vehicle M1 transmits IC identification information used for authentication to the information processing server 300. (6) Next, the information processing server 300 transmits the identification information of the user associated with the IC identification information to the agent server 200. (7) Next, the agent server 200 refers to the information stored in the storage 250 and transmits information on a difference between the first vehicle M1 and the second vehicle M2 to the first vehicle M1. The agent of the first vehicle M1 provides information on the difference to the user U1 based on the information transmitted from the agent server 200. Hereinafter, each process of processing will be described specifically.

[Processing Executed by Second Vehicle and Agent Server]

Figure 10:
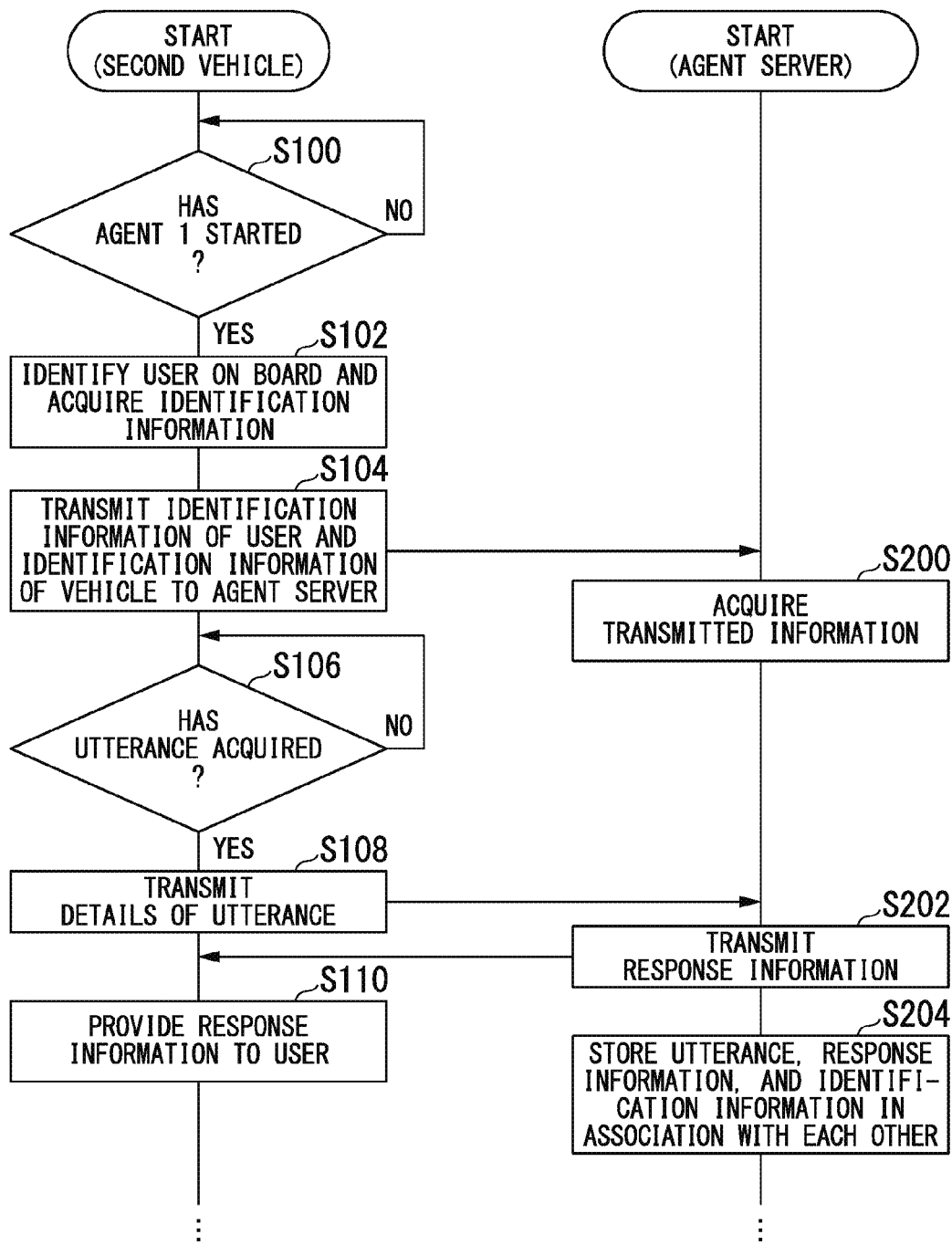
FIG. 10 is a flowchart showing an example of processing executed by a second vehicle M2 and the agent server.

FIG. 10 is a flowchart showing an example of processing executed by the second vehicle M2 and the agent server 200. Hereinafter, for example, processing executed by the agent server 200-1 and the agent controller 150-1 of the second vehicle M2 will be described. Regarding the configuration mounted in the second vehicle M2, (M2) is applied after the reference sign. Regarding the configuration mounted in the first vehicle M1, (M1) is applied after the reference sign.

First, it is determined whether or not the agent device 100 (M2) has started (Step S100). When the agent device 100 (M2) of the second vehicle M2 has started, the agent device 100 (M2) acquires the identification information of the user U1 on board in the second vehicle M2 (Step S102). The identification information is information acquired by the user recognition device 80. Next, the agent device 100 (M2) transmits the identification information of the user U1 and the identification information of the second vehicle M2 acquired in Step S102 to the agent server 200 (Step S104).

The agent server 200 acquires the information transmitted in Step S104 and stores the acquired information in the storage 250 (Step S200).

Next, the agent device 100 (M2) determines whether or not an utterance of the user U1 has been acquired (Step S106). When an utterance of the user U1 has been acquired, the agent controller 150-1 (M2) of the agent device 100 transmits the details of the utterance of the user U1 to the agent server 200 (Step S108).

The agent server 200 acquires the details of the utterance transmitted in Step S108, generates response information in accordance with the details of the utterance, and transmits the generated response information to the agent controller 150-1 (M2) (Step S202). Further, the agent controller 150-1 provides the response information to the user U1 (Step S110). Next, the agent server 200 stores the details of the utterance transmitted in Step S108, the response information generated in accordance with the details of the utterance, the identification information of the user U1 transmitted in Step S104, and the identification information of the vehicle transmitted in Step S104 in the storage 250 in association with each other (Step S204). This information is the historical information 260.

FIG. 11 is a view showing an example of details of the historical information 260. The historical information 260 is information in which identification information of a user, information provided to the agent server 200 by a user, or information provided to a user by an agent are associated with identification information of a vehicle. The historical information 260 is information in which identification information of a user, details of an utterance, and a date and a time when an utterance was acquired are associated with each other or information in which identification information of a user, details of response information, and a date and a time when response information was output are associated with each other.

Since the historical information 260 is generated in this manner, even when the user U1 is on board in the first vehicle M1 different from the second vehicle M2 on a day different from the day when the user U1 is on board in the second vehicle M2, response information, to which past information is added, is provided to the user U1. As described below, when the user U1 is on board in the first vehicle M1 different from the second vehicle M2, response information, to which past information is added, is provided to the user U1 (refer to FIG. 16).

The agent server 200 may refer to the historical information 260 stored in another agent server 200. For example, the agent server 200-1 may acquire a historical information 260-2 stored in a storage 250-2 of the agent server 200-2 from an agent server 200-2 and may provide a service to the user with reference to the acquired historical information 260-2.

When the agent 1 starts, another agent may start automatically. In this case, a predetermined agent server 200 may refer to the historical information 260 stored in the agent server 200 associated with an agent utilized most recently by the user, and the agent server 200 may provide a service to the user.

[Reservation Processing of First Vehicle]

FIG. 12 is a flowchart showing an example of a flow of processing executed by the general-purpose communication device 70 and the information processing server 300. First, the general-purpose communication device 70 transmits reservation information input based on an operation of the user U1 to the information processing server 300 (Step S300). For example, the reservation information includes a time zone at which the first vehicle M1 is utilized, identification information of the user U1, identification information of the second vehicle M2 utilized by the user U1, and the like.

The information processing server 300 acquires the reservation information transmitted in Step S300 and generates the reservation management information 322 based on the acquired reservation information (Step S400). The storage device of the information processing server 300 stores information in which the identification information of the user U1 and the IC identification information are associated with each other. The information processing server 300 refers to this information and generates the reservation management information 322.

FIG. 13 is a view showing an example of the reservation management information 322. The reservation management information 322 is information in which identification information of the first vehicle M1, a utilization time, identification information of a person (user U1) who made a reservation, and identification information of an IC card are associated with each other. Identification information of an integrated circuit (IC) card is information of an IC card used for authentication when a user utilizing a car-sharing service uses the vehicle M of the car-sharing service.

Next, the information processing server 300 transmits information indicating that the reservation has been confirmed to the general-purpose communication device 70 (Step S402). Next, the general-purpose communication device 70 receives information indicating that the reservation has been confirmed and causes a display of the general-purpose communication device 70 to display the received information (Step S302). Accordingly, processing of one routine in this flowchart ends.

In this manner, the reservation management information 322 in which the identification information of the user U1 (a person who made a reservation) and the identification information of the IC card are associated with each other is generated. Accordingly, the user U1 can utilize the reserved vehicle M.

[Provision of Information on Difference (Overview 1)]

When there is a difference between services respectively available from one or more agent controllers 150 (for example, the agent controllers 150-1 to 150-3) including at least the agent controller 150 (M1) utilized in the first vehicle M1 and one or more agent controllers 150 (for example, 150-1 to 150-3) utilized in the second vehicle M2, the agent controller 150 (M1) provides information on the difference.

"A difference" is a difference between services available for a user. A difference between available services includes a difference between specifications of the vehicles M, a difference between functions of the vehicles M, and a difference between services provided from agents due to a difference or the like between pieces of information which can be utilized by the vehicle M. "A difference" may include a difference between tasks assigned to agents, a difference between agents of the vehicle M, and a difference between services provided from agents due to these differences. Provision of information on a difference will be described below in detail in [Provision of information on difference (Part 1) to (Part 5)].

[Provision of Information on Difference (Overview 2)]

When there is a difference between a service available from the agent controller 150 (M1) itself and a service available from the agent controller 150 (M2) with a service name the same as a name of a service provided from the agent controller 150 (M1) in the second vehicle M2, the agent controller 150 (M1) may provide information on the difference. For example, the agent controller 150 (M1) provides information on the difference based on the information provided from the agent server 200. This processing will be described below in detail in the following sections [Provision of information on difference (Part 1), (Part 2), and (Part 4)]. For example, "a difference" in this case includes a difference between services provided from the same agent depending on the specification of the vehicle, the performance, and the information which can be utilized by the vehicle when the same agent is utilized in a different vehicle.

"A common service name" denotes that agent functions (voice recognition assistant functions) have a common service name (same service name), a common wake-up word (title of an agent) is used for starting the agent controllers at the time of initial shipment, and a service is provided to the agent devices 100 by a common manager. For example, being used with a common service name denotes that a common agent server 200 (or a common manager of the agent server 200) provides response information to the agent controller 150. For example, when an agent is provided with a service name and a title of "AA", even in a case in which the name "AA" has changed to a name "BB" due to a name changing function, the service name is "AA".

For example, "information on a difference" is information on a service which is available from the agent controller 150 (M2) but is not available from the agent controller 150 (M1). For example, when "a service A" and "a service B" are available from the agent controller 150 (M2) and "the service A" is not available from the agent controller 150 (M1), the agent controller 150 (M1) provides response information indicating that "the service A" is not available to the user.

For example, when a degree of freshness of information on a map of the first vehicle M1 is lower than a degree of freshness of information on a map of the second vehicle M2, there are cases in which the second vehicle M2 can provide "a timing of a lane change" to the user but the first vehicle M1 cannot provide "a timing of a lane change" to the user. This is because the map of the first vehicle M1 includes no information on lanes. In this case, the first vehicle M1 provides information indicating that a service of notification of "a timing of a lane change" is not available to the user.

For example, "information on a difference" may be information on a service which is available from the agent controller 150 (M1) but is not available from the agent controller 150 (M2). For example, when "the service A" and "the service B" are available from the agent controller 150 (M1) and "the service A" is not available from the agent controller 150 (M2), the agent controller 150 (M1) provides response information indicating that "the service A" is available to the user.

For example, when a speaker or an amplifier which can output a predetermined base sound is mounted in the first vehicle M1 and the speaker or the amplifier is not mounted in the second vehicle M2, the first vehicle M1 provides information indicating that "it is possible to enjoy music of a base sound" to the user.

When there is a difference between a service which has already been provided to the user from the agent controller 150 (M2) with a title the same as a title of a service used by the agent controller 150 (M1) in the second vehicle M2 and a service available for the user from the agent controller 150 (M1), the agent controller 150 (M1) may provide information on the difference to the user.

For example, when the agent controller 150 (M2) has already provided "the service A" and "the service B" to the user and "the service A" is available for the user from the agent controller 150 (M1), the agent controller 150 (M1) provides response information indicating that "the service B" is not available or information indicating that "the service A" is available to the user.

When a request for a service which is not available from the agent controller 150 (M1) itself is acquired, the agent controller 150 (M1) may provide information on a difference. For example, when "the service A" is not available, if provision of "the service A" is requested, the agent controller 150 (M1) provides response information indicating that "the service A" is not available to the user. In this case, the agent controller 150 (M1) may provide information indicating that "the service A" is utilizable in the second vehicle M2 but is not utilizable in the first vehicle M1 to the user.

[Processing for Outputting Information on Difference]

Figure 14:
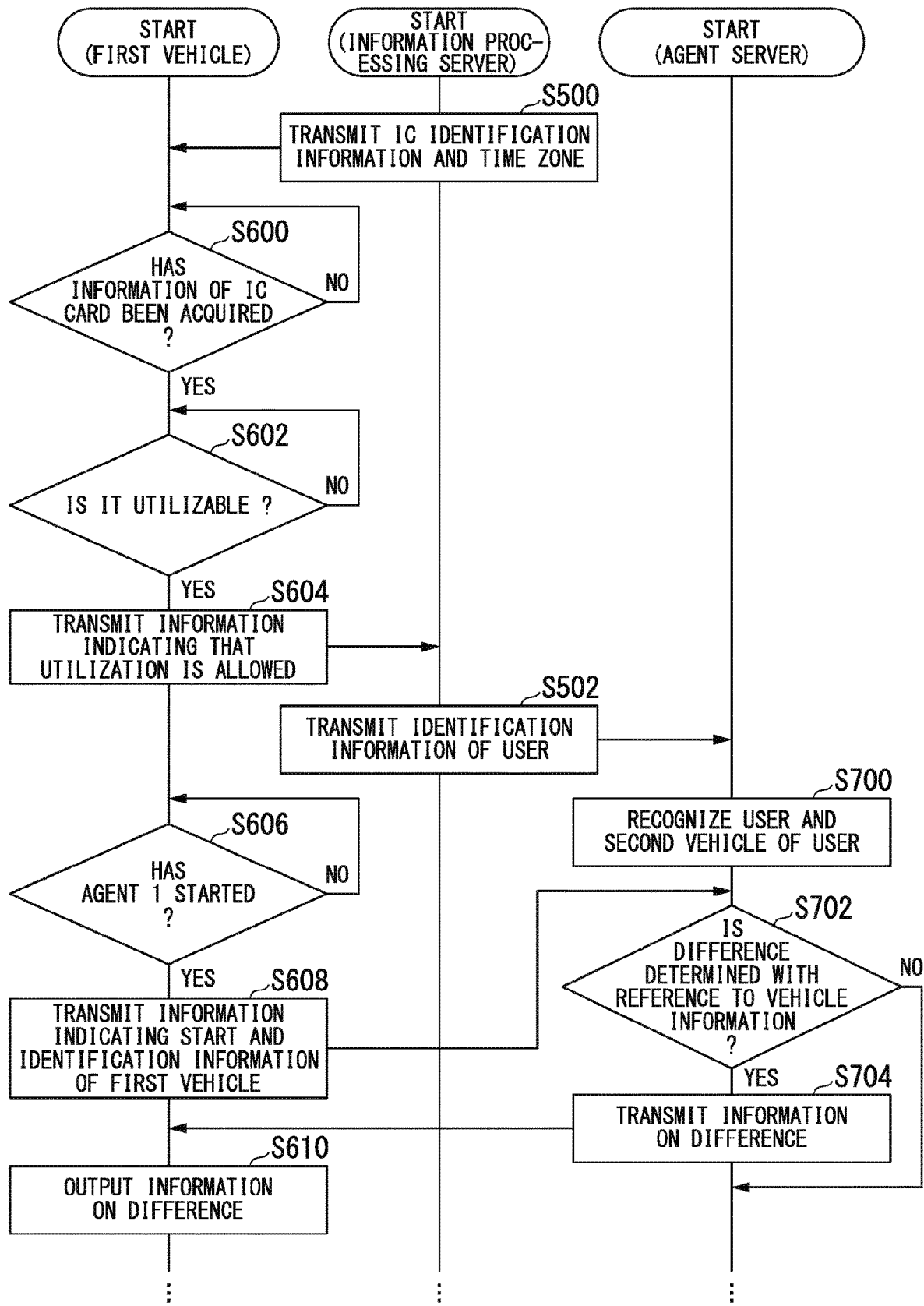
FIG. 14 is a flowchart showing a flow of processing in which information on a difference is output in a second vehicle.

FIG. 14 is a flowchart showing a flow of processing in which information on a difference is output in the second vehicle M2. This processing will be described focusing on the agent 1. First, the information processing server 300 refers to the reservation management information 322 and transmits the IC identification information of the user U1 and the time zone at which the user U1 utilizes the first vehicle M1 to the first vehicle M1 reserved by the user (Step S500). Accordingly, the first vehicle M1 stores the time zone at which the first vehicle M1 is utilized and the IC identification information in the storage device.

Next, it is determined whether or not the IC card reader 90 of the first vehicle M1 has acquired the information of the IC card (Step S600). For example, when the user U1 holds the IC card over the IC card reader 90 of the first vehicle M1, the IC card reader 90 acquires the identification information of the IC card.

Next, the identifier 115 determines whether or not the user U1 holding the IC card is allowed to utilize the first vehicle M1 (Step S602). For example, when the IC identification information acquired in Step S600 and the IC identification information transmitted in Step S500 coincide with each other, and when the time at which the IC identification information is acquired in Step S600 is included in the time zone which is associated with the IC identification information transmitted in Step S500, the identifier 115 determines that the user U1 is allowed to utilize the first vehicle M1. In this case, the first vehicle M1 causes a door lock to be in an unlocked state based on an instruction of the identifier 115. The user U1 can be on board in the first vehicle M1 and can start the first vehicle M1 using a key accommodated inside the first vehicle M1.

When it is determined that the user U1 is allowed to utilize the first vehicle M1, the first vehicle M1 transmits information indicating that utilization is allowed to the information processing server 300 (Step S604). Next, when the information transmitted in Step S604 is acquired, the information processing server 300 transmits the identification information of the user U1 in the reservation management information 322 associated with the IC identification information transmitted in Step S500 to the agent server 200 (Step S502).

The agent server 200 acquires the identification information of the user U1 transmitted in Step S502 and recognizes the second vehicle M2 which has been utilized by the user U1 and is associated with the acquired identification information with reference to the historical information 260 (Step S700). In the present embodiment, description is given with an example in which the second vehicle M2 which has been utilized by the user U1 is identified. In place of (in addition to) these, a vehicle M which is associated with the user U1 and is not related to utilization of the user U1 may be recognized. In this case, for example, the storage 250 of the agent server 200 stores information in which the identification information of the user U1 and the identification information of the second vehicle M2 are associated with each other.

Next, the first vehicle M1 determines whether or not the agent 1 has started (Step S606). When the agent 1 has started, the first vehicle M1 transmits information indicating that the agent 1 has started and the identification information of the first vehicle M1 to the agent server 200 (Step S608).

Next, the determiner 232 of the agent server 200 refers to the vehicle information 262 and determines whether or not information on a difference between the first vehicle M1 and the second vehicle M2 is output (Step S702). The vehicle information 262 is information in which the information on the vehicle M is associated with identification information of the vehicle M. The information on the vehicle M is information for determining a difference between services available for the user U1.

Figure 15:
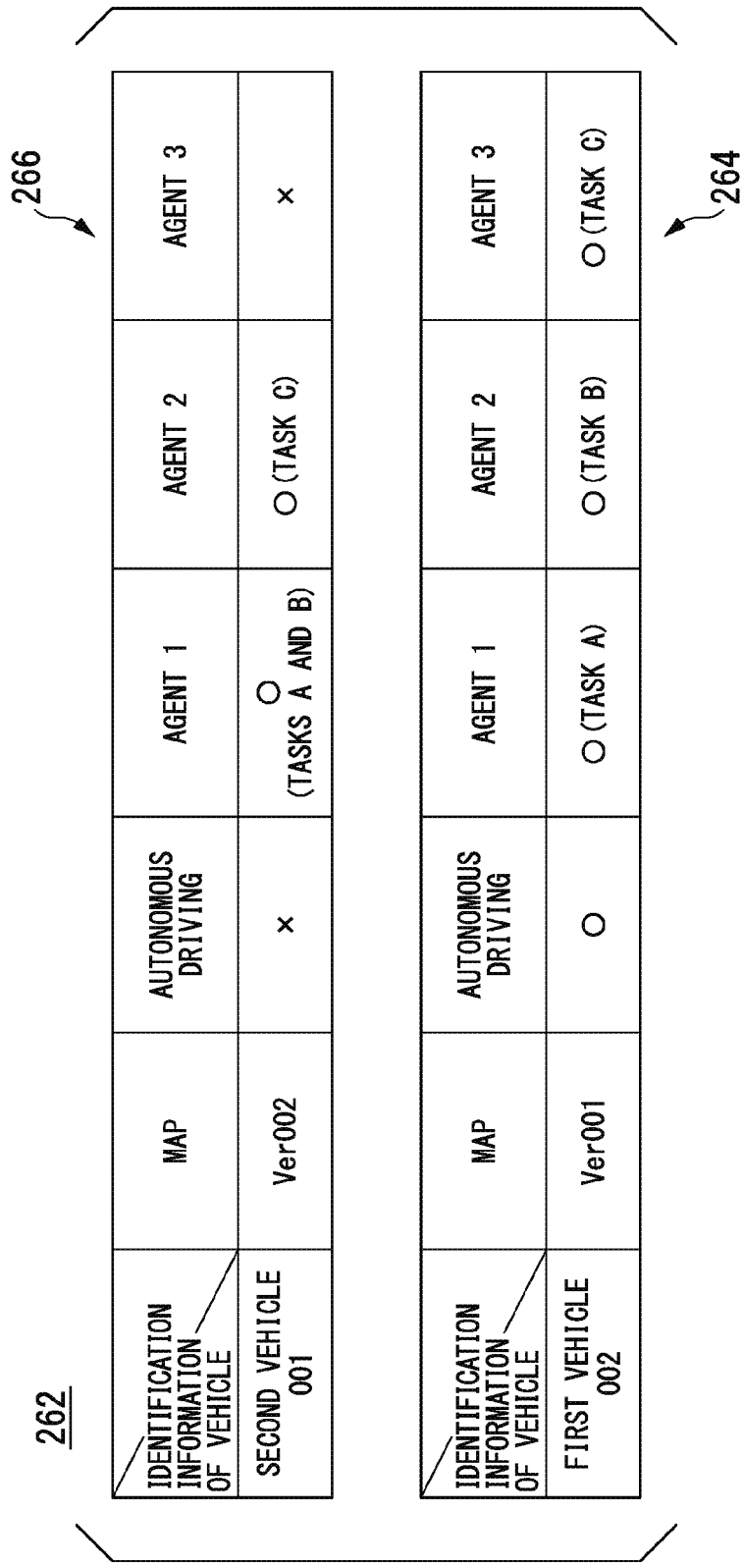
FIG. 15 is a view showing an example of details of vehicle information.

FIG. 15 is a view showing an example of details of the vehicle information 262. The information on a vehicle is information on a version of a map utilized by the vehicle M, the presence or absence of an autonomous driving function (automated driving function), the presence or absence of a driving support function, a type of an agent utilizable in the vehicle M, and the like. A task assigned to each agent is associated with the vehicle information 262. Description or the like regarding an assigned task will be given below using FIGS. 20 and 21. Hereinafter, in information included in the vehicle information 262, there are cases in which information on the first vehicle M1 will be referred to as "first vehicle information (264 in the diagram)" and information on the second vehicle M2 will be referred to as "second vehicle information (266 in the diagram)". For example, the agent server 200 compares predetermined items of the first vehicle M1 and predetermined items of the second vehicle M2 in the vehicle information 262 to each other and determines whether or not a difference is present between details of the items. For example, in the example of FIG. 15, a difference is present between the items related to the autonomous driving function.

When it is determined that information on the difference is output, the agent server 200 transmits the information on the difference to the first vehicle M1 (Step S704). The agent controller 150 of the first vehicle M1 outputs the information on the difference based on the information transmitted in Step S704 (Step S610) and executes [Processing for providing response information with respect to utterance] thereafter. When it is determined that the information on the difference is not output, the process skips the processing in Step S610 and executes [Processing for providing response information with respect to utterance] (refer to FIG. 16).

Accordingly, when a difference is present between services available in the first vehicle M1 and the second vehicle M2, information on the difference is output to the user. As a result, the user can recognize the difference between available services, so that it is possible to prevent the user from requesting provision of an unavailable service or expecting provision of an unavailable service. As a result, satisfaction of the user is improved.

A technique in which the agent server 200 acquires identification information of the user U1 is not limited to the example of the foregoing embodiment. For example, the first vehicle M1 and the general-purpose communication device 70 retained by the user U1 may communicate with each other, such that the first vehicle M1 acquires the identification information of the user U1 and the acquired identification information is transmitted to the agent server 200.

[Processing for Providing Response Information with Respect to Utterance]

Figure 16:
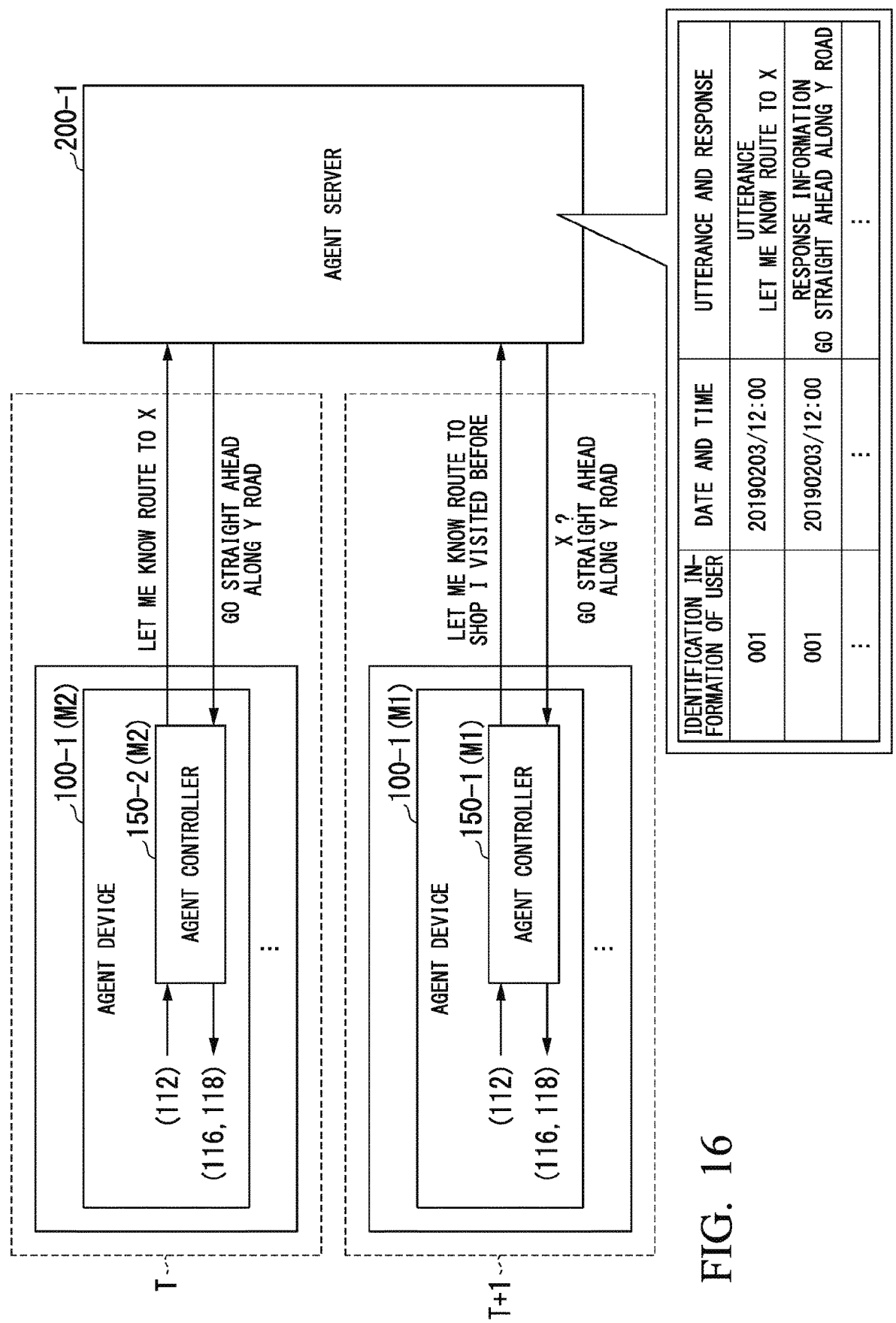
FIG. 16 is a view for describing an overview (Part 1) of response information provided to the agent server.

FIG. 16 is a view for describing an overview (Part 1) of response information provided to the agent server 200 (200-1). The agent server 200 refers to the historical information 260 stored in the storage 250, generates response information with respect to the information transmitted from the agent controller 150, and provides the generated response information to the agent controller 150.

For example, it is assumed that the user U1 of the second vehicle M2 utters "LET ME KNOW A ROUTE TO X" at a time T and the agent controller 150 (M2) mounted in the second vehicle M2 responds "GO STRAIGHT AHEAD ALONG Y ROAD" based on the response information of the agent server 200.

When the user U1 of the first vehicle M1 utters "LET ME KNOW A ROUTE TO THE SHOP MENTIONED BEFORE" at a time T+1, the agent server 200 refers to the utterance and the response information at the time T and generates response information. Further, for example, the agent controller 150 (M1) mounted in the first vehicle M1 provides "X? GO STRAIGHT AHEAD ALONG Y ROAD" (response information of the agent server 200) to the user U1. The user U1 of the second vehicle M2 is the same user as the user U1 of the first vehicle M1.

As described above, when agents having a common (same type) service name are mounted in the first vehicle M1 and the second vehicle M2, the agent server 200 refers to the common historical information 260 and provides response information. Therefore, response information in which past information is referred to in a different vehicle is provided to the user. As a result, satisfaction of the user is improved.

[Provision of Information on Difference (Part 1)]

When provision of a service similar to a service provided upon execution of a particular function of the second vehicle M2 in accordance with an utterance of the user is requested and the first vehicle M1 is not able to respond to the request, the agent controller 150 (M) provides information on a difference.

"A particular function" is a function which can be executed by the vehicle M. For example, a particular function includes a function related to the air-conditioning device mounted in the vehicle M, a function of providing entertainment to the user (provision of movies, TV broadcasting, or music), a function of guiding a route to a destination, a function related to a behavior of the vehicle M, and the like. A function related to a behavior of the vehicle M includes the autonomous driving function, a following travel function, an automatic parking function, an automatic lane keeping function, and the like. The agent server 200 retains information on particular functions which can be executed by each of the vehicles.

Figure 17:
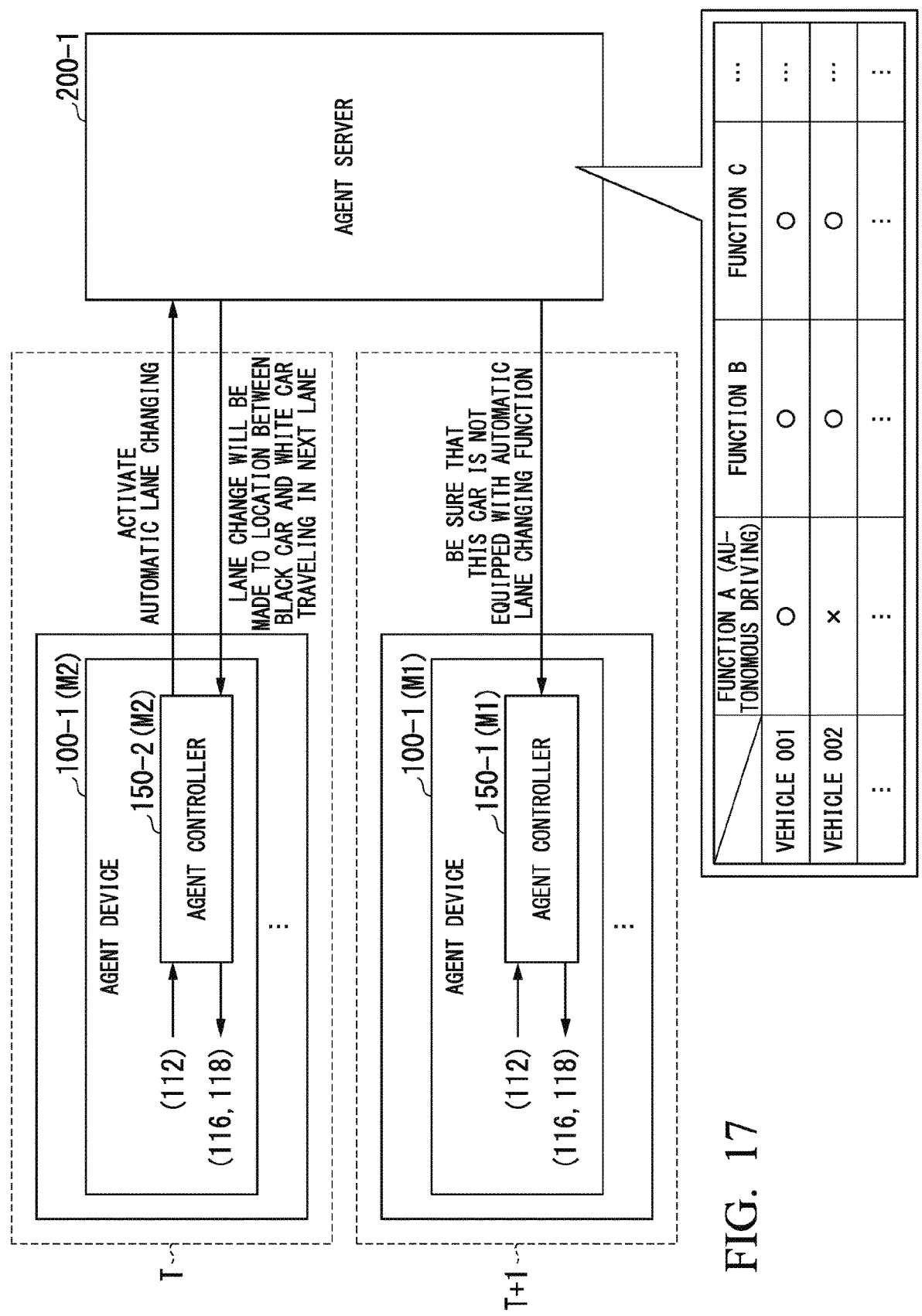
FIG. 17 is a view (Part 1) showing an example of a scene providing information on a difference.

FIG. 17 is a view (Part 1) showing an example of a scene providing information on a difference. For example, the autonomous driving function can be executed in the second vehicle M2, and the autonomous driving function cannot be executed in the first vehicle M1. In this case, when the user U1 who has been on board in the second vehicle M2 in the past is on board in the first vehicle M1, the agent server 200 provides information indicating that the autonomous driving function cannot be executed to the agent controller 150 (M1). Further, the agent controller 150 (M1) provides information indicating that the autonomous driving function cannot be executed to the user U1. For example, the agent controller 150 (M1) provides information such as "BE SURE THAT THIS CAR IS NOT EQUIPPED WITH AN AUTOMATIC LANE CHANGING FUNCTION" to the user U1.

In this manner, the user U1 can easily recognizes that the function can be executed in the second vehicle M2 but cannot be executed in the first vehicle M1. Therefore, convenience of the user U1 is improved.

Consequently, satisfaction of the user is improved.

[Provision of Information on Difference (Part 2)]

When a degree of freshness of information on a map utilized in the first vehicle M1 is lower than a degree of freshness of information on a map utilized in the second vehicle M2, the agent controller 150 (M1) provides information on a difference between the degrees of freshness to the user U1.

For example, "a degree of freshness of information on a map" is a degree of freshness of information (date freshness or map version) included in a map. For example, as the degree of freshness becomes higher, past information closer to the present is included in the map. For example, the map is updated for an upgraded version, and as the version becomes higher, the degree of freshness of information becomes higher. For example, when the degree of freshness of information on a map is low, provided information may be inaccurate or the accuracy may deteriorate compared to a case of a higher degree of freshness of information on a map. When the degree of freshness of information is low, there are cases in which execution of a particular function such as autonomous driving may be limited or execution thereof may not be able to be performed. When the degree of freshness of information on a map is low, compared to the case of a higher degree of freshness of information on a map, information provided to the user regarding route guidance utilizing the navigation device 40 may not be specific or may be information in which satisfaction of the user is low. The agent server 200 retains information on the degree of freshness of information on a map mounted in or utilized by each of the vehicles. The agent server 200 may acquire information on the degree of freshness of information on a map from a vehicle.

Figure 18:
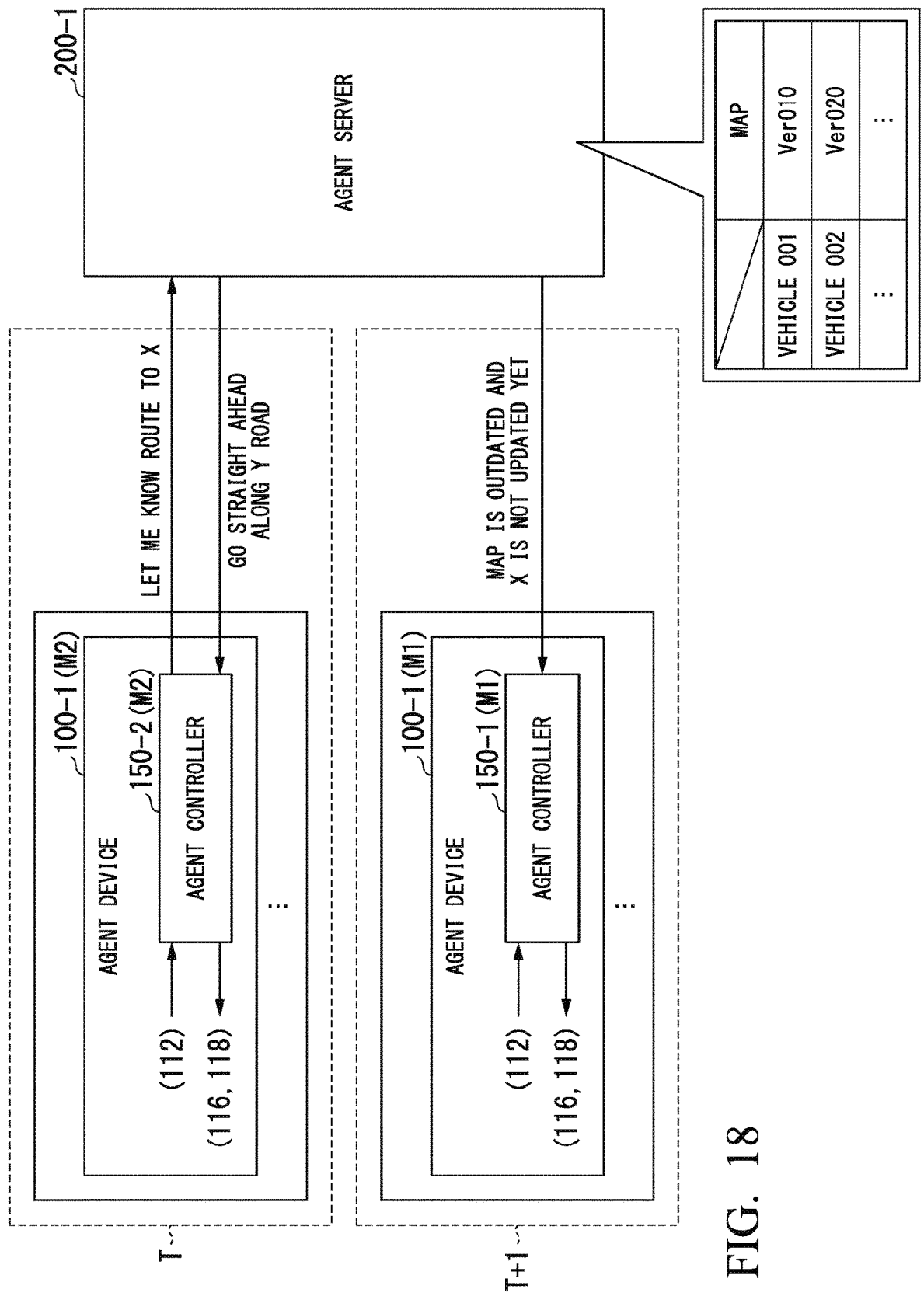
FIG. 18 is a view (Part 2) showing an example of a scene providing information on a difference.

FIG. 18 is a view (Part 2) showing an example of a scene providing information on a difference. For example, a map utilized in the first vehicle M1 has a lower degree of freshness of information than a map utilized in the second vehicle M2. In this case, when the user U1 who has been on board in the second vehicle M2 in the past is on board in the first vehicle M1, the agent server 200 provides information indicating that the degree of freshness of information on a map of the first vehicle M1 is lower than the degree of freshness of information on a map of the second vehicle M2 to the agent controller 150 (M1).

Further, the agent controller 150 (M1) provides information indicating that the degree of freshness of information on a map of the first vehicle M1 is lower than the degree of freshness of information on a map of the second vehicle M2 to the user U1. When the second vehicle M2 is on board, the user U1 inquires of an agent "LET ME KNOW A ROUTE TO X", and the agent responds "GO STRAIGHT AHEAD ALONG ○○". When the user U1 is on board in the first vehicle M1 after being on board in the second vehicle M2, for example, an agent responds "X YOU HAVE MENTIONED BEFORE IS NOT UPDATED DUE TO THE OUTDATED VERSION OF THE MAP OF THE FIRST VEHICLE M1". Since the degree of freshness of information on a map of the first vehicle M1 is low, the user U1 can recognize that the information provided from the first vehicle M1 is limited information.

In the foregoing example, the agent controller 150 provides response information to the user in association with the agent server 200, but the agent controller 150 may provide response information to the user without being in association with the agent server 200. In this case, for example, the agent controller 150 provides response information to the user in association with the navigation device 40 or with reference to the map information.

In this manner, the user U1 can easily recognize that the degree of freshness of information on a map of the first vehicle M1 is low. Therefore, convenience of the user U1 is improved. Consequently, satisfaction of the user is improved.

[Provision of Information on Difference (Part 3)]

When there is a difference between a type of the agent controller 150 performing processing for providing a service which is utilizable in the first vehicle M1 and includes causing an output device to output a response of voice in response to an utterance of the user of the first vehicle M1 and a type of the agent controller 150 (M2), the agent controller 150 (M1) provides information on the difference between the types to the user. The agent controller 150 (M2) is an agent controller performing processing for providing a service which is utilizable in the second vehicle M2 and includes causing an output device to output a response of voice in response to an utterance of the user of the second vehicle M2.

For example, a difference between the types of agent controllers 150 or agents is a difference between service names of agents or a difference between types of agent servers 200 providing response information. A difference between agent servers 200 is a difference between managers managing the agent servers 200. When the manager is the same even if the agent servers 200 physically differ from each other, this is not counted as a difference. For example, the agents 1, 2, and 3 are agents of different types.

Figure 19:
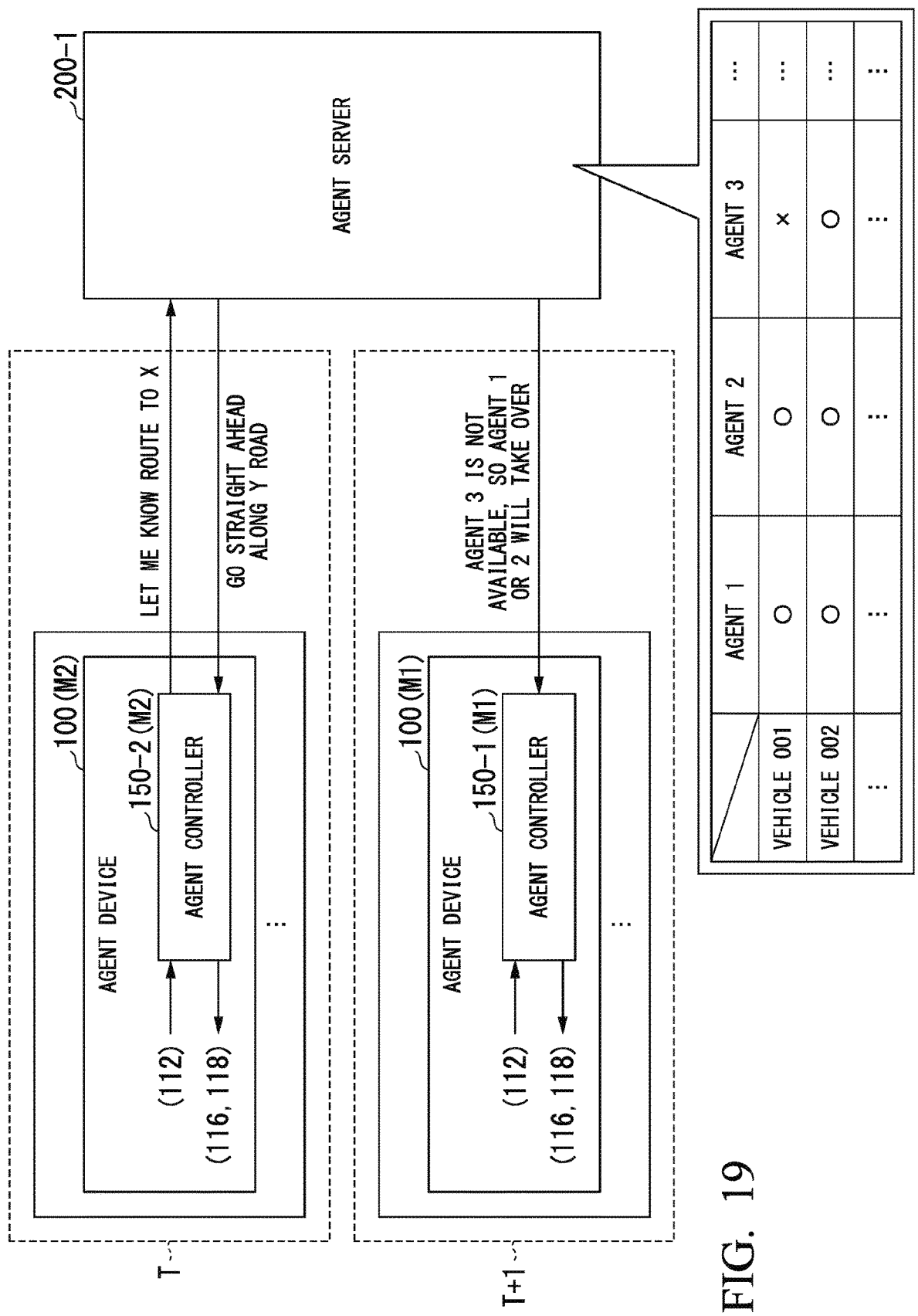
FIG. 19 is a view (Part 3) showing an example of a scene providing information on a difference.

FIG. 19 is a view (Part 3) showing an example of a scene providing information on a difference. For example, agents utilizable in the first vehicle M1 are the agents 1 and 2, and agents utilizable in the second vehicle M2 are the agents 1, 2, and 3. In this case, when the user U1 who has been on board in the second vehicle M2 in the past is on board in the first vehicle M1, the agent server 200 provides information indicating that the agent 3 is not present to the agent controller 150 (M1). Further, the agent controller 150 (M1) provides information indicating that the agent 3 is not present to the user U1.

When the user U1 is on board in the first vehicle M1 after being on board in the second vehicle M2, for example, the agent 1 or 2 responds "AGENT 3 IS NOT AVAILABLE IN THE SECOND VEHICLE M2, SO AGENT 1 OR 2 WILL TAKE OVER". For example, the user U1 can recognize that the agent 3 which has been utilized in the second vehicle M2 is not present and a service can be provided from the agent 1 or 2.

In this manner, the user U1 can easily recognize an agent which is utilizable in the vehicle M1. Therefore, convenience of the user U1 is improved. Consequently, satisfaction of the user is improved.

[Provision of Information on Difference (Part 4)]

When there is a difference between a task assigned to the agent controller 150 (M1) itself and a task assigned to the agent controller (M2), the agent controller 150 (M1) provides information on the difference.

For example, an assigned task includes a service provided from itself. For example, a task is route guidance, information on a point of interesting (POI) around a destination, provision of music, an interaction with the user U1, control related to a behavior of a vehicle, and the like.

Figure 20:
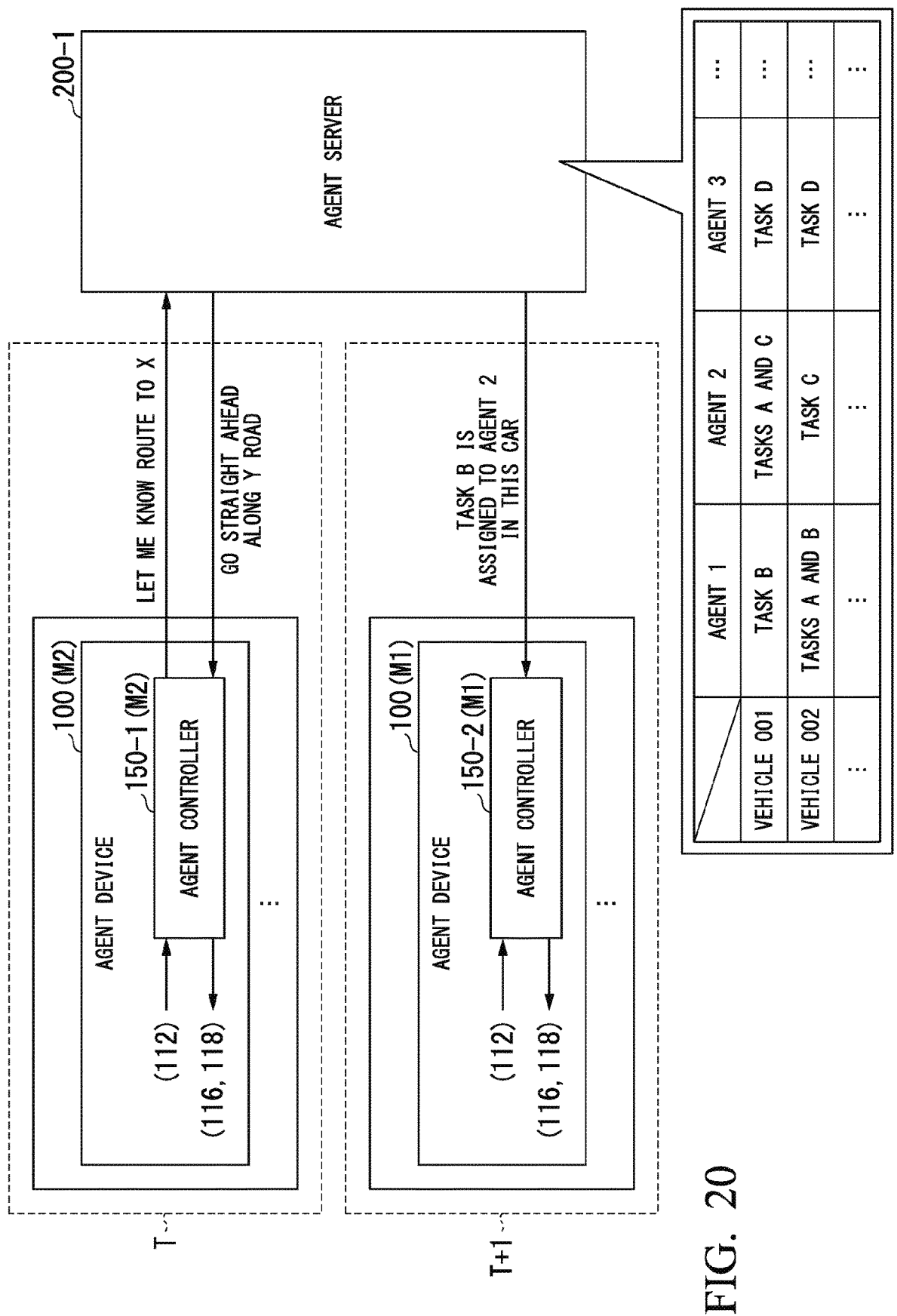
FIG. 20 is a view (Part 4) showing an example of a scene providing information on a difference.

FIG. 20 is a view (Part 4) showing an example of a scene providing information on a difference. For example, it is assumed that the agent 1 is assigned with tasks A and B in the second vehicle M2 but the agent 1 is assigned with the task B in the first vehicle M1. In this case, when the user U1 who has been on board in the second vehicle M2 in the past is on board in the first vehicle M1, the agent server 200 provides information indicating that the second vehicle M2 and the first vehicle M1 are assigned with different tasks to the agent controller 150 (M1). For example, the agent server 200 provides information indicating that the first vehicle M1 is assigned with the task B to the agent controller 150 (M1). Further, the agent controller 150 (M1) provides information indicating that the agent 1 is assigned with the task B to the user U1.

When the user U1 is on board in the first vehicle M1 after being on board in the second vehicle M2, for example, the agent 1 says "I AM ASSIGNED WITH THE TASK B IN THIS VEHICLE". For example, the user U1 can easily recognize that the tasks assigned to the agent 1 are different from each other between the first vehicle M1 and the second vehicle M2.

In this manner, the user U1 can easily recognize that the task assigned to the agent 1 has changed between the vehicle in which the user U1 has been on board in the past and the vehicle in which the user U1 is on board currently. Therefore, convenience of the user U1 is improved. Consequently, satisfaction of the user is improved.

[Provision of Information on Difference (Part 5)]

When there is a difference between a type of the agent controller performing processing for providing a service which is assigned with a particular task of the first vehicle M1 and includes causing an output device to output a response of voice in response to an utterance of the user of the first vehicle M1 and a type of the agent controller 150 (M2), the agent controller 150 (M1) provides information on the difference between the types. The agent controller 150 (M2) is an agent controller performing processing for providing a service which is assigned with a particular task of the second vehicle M2 and includes causing an output device to output a response of voice in response to an utterance of the user of the second vehicle M2.

Figure 21:
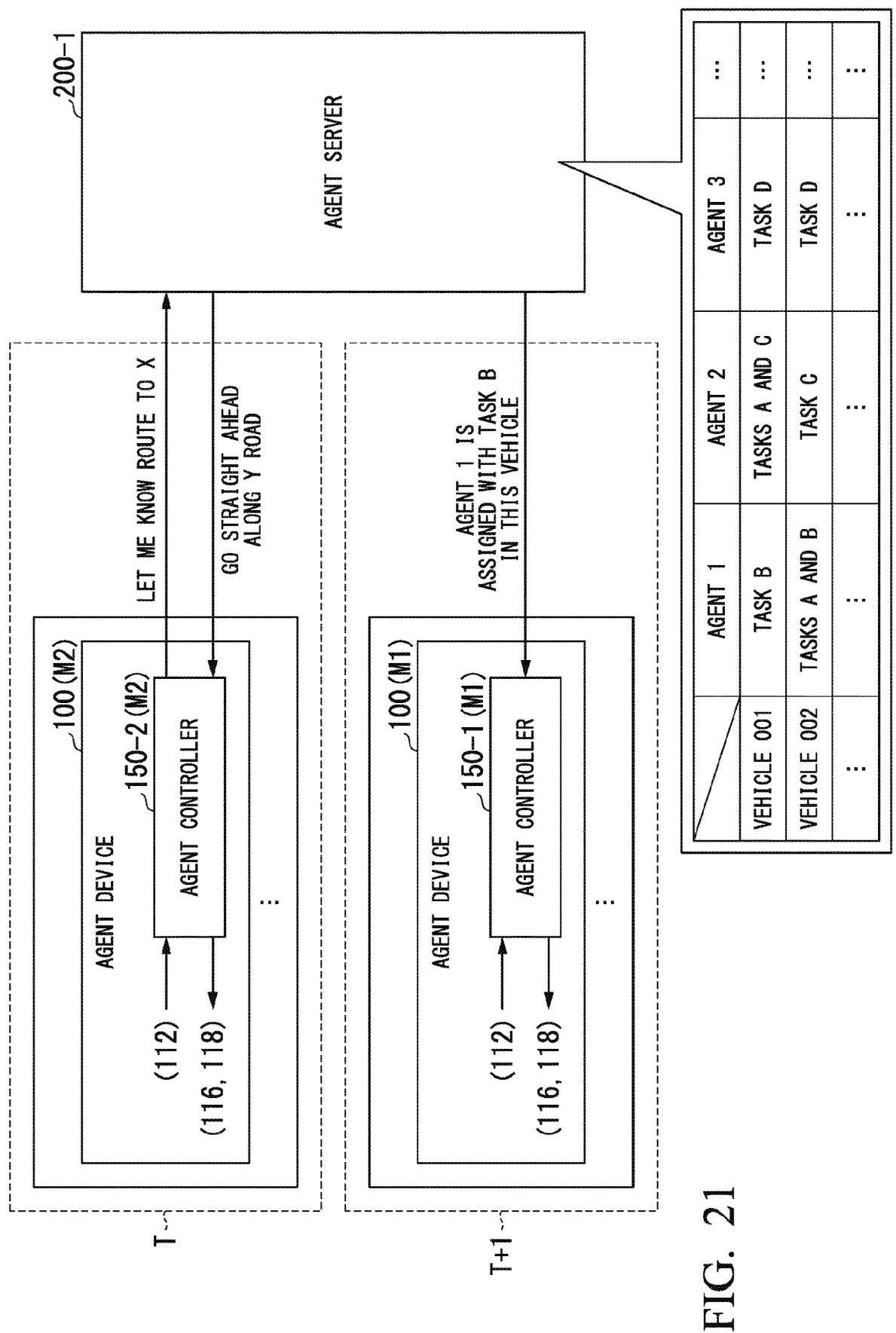
FIG. 21 is a view (Part 5) showing an example of a scene providing information on a difference.

FIG. 21 is a view (Part 5) showing an example of a scene providing information on a difference. For example, it is assumed that the agent 1 is assigned with the task A in the second vehicle M2 but the agent 2 is assigned with the task A in the first vehicle M1. In this case, when the user U1 is on board in the first vehicle M1, the agent server 200 provides information indicating that the agent 2 is assigned with the task A to the agent controller 150 (M1). Further, the agent controller 150 (M1) provides information indicating that the agent 2 is assigned with the task A to the user U1.

When the user U1 is on board in the first vehicle M1 after being on board in the second vehicle M2, for example, the agent 2 says "GUIDE (TASK A) TO THE DESTINATION IS ASSIGNED TO THE AGENT 2 INSTEAD OF THE AGENT 1, SO THE AGENT 2 WILL GUIDE YOU TO THE DESTINATION". For example, the user U1 can recognize that the task A is assigned to the agent 2 instead of the agent 1 which has been utilized in the second vehicle M2. In this case, the agent 1 may start the agent 2 or may urge the user to start the agent 2.

In this manner, the user U1 can easily recognize that the agent assigned with a predetermined task in the vehicle in which the user U1 has been on board in the past has changed. Therefore, convenience of the user is improved. Consequently, satisfaction of the user is improved.

In the foregoing example (for example, in [Provision of information on difference (Part 1) to (Part 5)]), information on a service which is available from the agent controller 150 of the first vehicle M1 but is not available from the agent controller 150 of the second vehicle M2 may be provided to the user, or information on a difference between a service which has already been provided from the agent controller 150 of the second vehicle M2 and a service available for the user from the agent controller 150 of the first vehicle M1 may be provided to the user. When a request for a service which is not available from the agent controller of the first vehicle M1 itself is acquired, the agent controller may provide information on the difference.

For example, when the user is on board in a vehicle utilized in a car-sharing service or the like after the user is on board in a vehicle familiar to the user in normal times, there are cases in which a difference occurs between services to be provided. The user can automatically recognize information on the difference. Therefore, convenience of the user is improved, and satisfaction of the user is improved.

According to the first embodiment described above, when there is a difference between a service which is utilized in the first vehicle M1 and is available from the agent controllers 150-1 to 150-3 (M1) and a service which is utilized in the second vehicle M2 and is available from one or more agent controllers 150-1 to 150-3 (M2), the agent device 100 provides information on the difference. Therefore, satisfaction of the user can be improved.

Second Embodiment

Hereinafter, a second embodiment will be described. In the second embodiment, the agent device 100 determines whether or not a difference is present between a service available from the agent controllers 150-1 to 150-3 (M1) and a service available from one or more agent controllers 150-1 to 150-3 (M2) utilized in the second vehicle M2. Hereinafter, differences between the first embodiment and the second embodiment will be described mainly.

Figure 22:
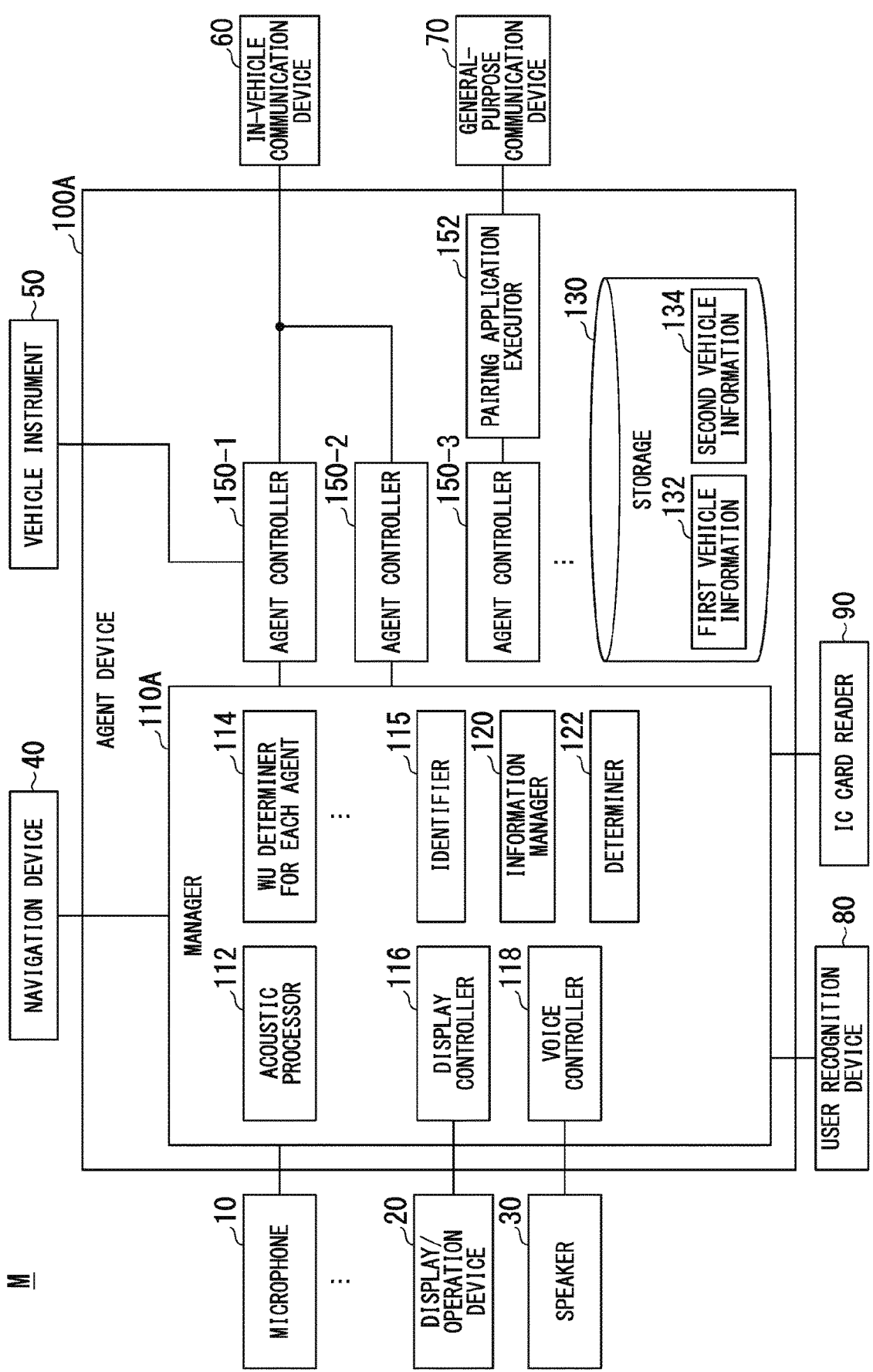
FIG. 22 is a view showing a configuration of an agent device according to a second embodiment and instruments mounted in the vehicle.

FIG. 22 is a view showing a configuration of an agent device 100A according to the second embodiment and instruments mounted in the vehicle M. The agent device 100A includes a manager 110A in place of the manager 110. The agent device 100A further includes a storage 130. In addition to the configuration of the functions of the manager 110 in the first embodiment, the manager 110A includes an information manager 120 and a determiner 122. The storage 130 stores a first vehicle information 132 and a second vehicle information 134. The second vehicle information 134 is information provided from the agent server 200.

The information manager 120 manages the information processing server 300 or information transmitted from the vehicle M and transmits information processed by the host device to the information processing server 300 or the vehicle M. For example, the information manager 120 provides information on a difference between a service available from the agent controller 150 of the first vehicle M1 and a service available from the agent controller of the second vehicle M2 to the agent device 100 based on a result of determination of the determiner 122.

The determiner 122 determines whether or not a difference is present between a service available from the agent controller 150 of the first vehicle M1 and a service available from the agent controller of the second vehicle M2 based on the first vehicle information on the first vehicle M1 in which the user is on board and the second vehicle information on the second vehicle M2 which has been utilized before the user utilizes the first vehicle M1 in accordance with information transmitted from the agent device 100.

Figure 23:
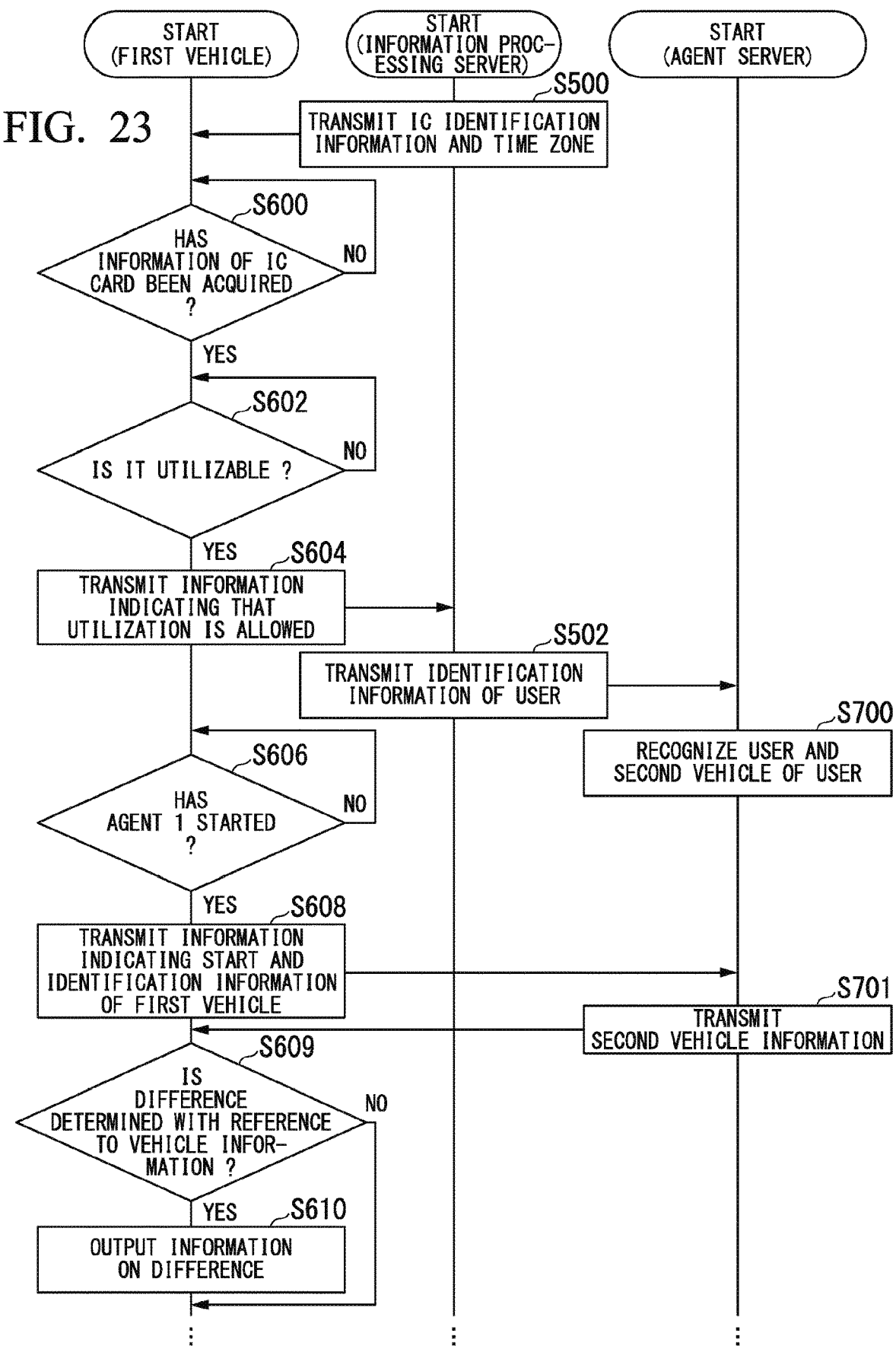
FIG. 23 is a flowchart showing a flow of processing in which information on a difference is output in the second vehicle of the second embodiment.

FIG. 23 is a flowchart showing a flow of processing in which information on a difference is output in the second vehicle M2 of the second embodiment. Processing of Steps S500, S502, S600 to S608, S610, and S700 in FIG. 23 is processing similar to the processing of the same step number in FIG. 14. Therefore, description thereof will be omitted.

When the agent 1 has started in Step S606, the first vehicle M1 transmits information indicating that the agent 1 has started and identification information of the first vehicle M1 to the agent server 200 (Step S608). Next, when the information transmitted in Step S608 is acquired, the agent server 200 transmits the second vehicle information to the first vehicle M1 (Step S701). The information transmitted in Step S701 is acquired by the information manager 120 of the first vehicle M1 and is stored in the storage 130.

The determiner 122 of the first vehicle M1 determines whether or not information on a difference is output based on the first vehicle information 132 and the second vehicle information 134 stored in the storage 130 (Step S609). When it is determined that the information on the difference is output, the process proceeds to the processing in Step S610. When it is determined that the information on the difference is not output, the process skips the processing in Step S610.

According to the second embodiment described above, effects similar to those in the first embodiment are exhibited.

In each of the foregoing embodiments, processing in a case in which a user U utilizes the first vehicle M1 and the second vehicle M2 has been described. However, when a plurality of users (a user U1 and a user U2) utilize the second vehicle M2 and any user (for example, the user U1) utilizes the first vehicle M1 thereafter, the foregoing information on the difference may be provided to the user.

Hereinabove, forms for performing the present invention have been described using the embodiments. However, the present invention is not limited to the embodiments, and various modifications and replacements can be applied within a range not departing from the gist of the present invention.

What is claimed is:

1. An agent device comprising:
  an acquirer configured to acquire an utterance of a user of a first vehicle; and
  a first agent controller configured to perform processing for providing a service including causing an output device to output a response of voice in response to an utterance of the user of the first vehicle acquired by the acquirer,
  wherein when there is a difference between a service which is utilizable in the first vehicle and is available from one or more agent controllers including at least the first agent controller and a service which is utilizable in a second vehicle and is available from one or more agent controllers, the first agent controller provides information on the difference, wherein when there is a difference between a type of an agent controller performing processing for providing a service which is assigned with a particular task of the first vehicle and includes causing an output device to output a response of voice in response to an utterance of the user of the first vehicle acquired by the acquirer and a type of an agent controller performing processing for providing a service which is assigned with a particular task of the second vehicle and includes causing an output device to output a response of voice in response to an utterance of the user of the second vehicle acquired by the acquirer, the first agent controller provides information on the difference between the types.

2. The agent device according to claim 1,
wherein the first agent controller is included in the second vehicle, and
wherein when there is a difference between a service available from the first agent controller and a service available from a second agent controller with a service name the same as a name of a service provided from the first agent controller in the second vehicle, the first agent controller provides information on the difference.

3. The agent device according to claim 2,
wherein the first agent controller provides information on a service which is available from the second agent controller but is not available from the first agent controller as information on the difference.

4. The agent device according to claim 3,
wherein when a request for a service which is not available from the first agent controller itself is acquired, the first agent controller provides information on the difference.

5. The agent device according to claim 2,
wherein the first agent controller provides information on a service which is available from the first agent controller but is not available from the second agent controller as information on the difference.

6. The agent device according to claim 1,
wherein when there is a difference between a service which has already been provided to the user from a second agent controller with a service name the same as a name of a service provided from the first agent controller in the second vehicle and a service available for the user from the first agent controller, the first agent controller provides information on the difference.

7. The agent device according to claim 1 further comprising:
a determiner configured to determine whether or not the difference is present based on first vehicle information on the first vehicle in which the user is on board and second vehicle information on the second vehicle which has been utilized before the user utilizes the first vehicle,
wherein the first agent controller provides information on the difference based on a result of determination of the determiner.

8. The agent device according to claim 1,
wherein when provision of a service similar to a service provided upon execution of a particular function of the second vehicle in accordance with an utterance of the user is requested and the first agent controller is not able to respond to the request in the first vehicle, the first agent controller provides information on the difference.

9. The agent device according to claim 8 further comprising:
a determiner configured to determine whether or not a difference is present between a particular function of the first vehicle and the particular function of the second vehicle based on first vehicle information including a service provided upon execution of the particular function of the first vehicle and second vehicle information including a service provided upon execution of the particular function of the second vehicle in response to an utterance of the user,
wherein the first agent controller provides information on the difference based on a result of determination of the determiner.

10. The agent device according to claim 1,
wherein when a degree of freshness of information on a map utilized in the first vehicle is lower than a degree of freshness of information on a map utilized in the second vehicle, the first agent controller provides information on the difference.

11. The agent device according to claim 10 further comprising:
a determiner configured to determine whether or not a difference is present between the degrees of freshness of information on a map based on first vehicle information including information on the degree of freshness of information on a map utilized in the first vehicle and second vehicle information including information on the degree of freshness of information on a map utilized in the second vehicle,
wherein the first agent controller provides information on the difference based on a result of determination of the determiner.

12. The agent device according to claim 1,
wherein when there is a difference between a type of an agent controller performing processing for providing a service which is utilizable in the first vehicle and includes causing an output device to output a response of voice in response to an utterance of the user of the first vehicle acquired by the acquirer and a type of an agent controller performing processing for providing a service which is utilizable in the second vehicle and includes causing an output device to output a response of voice in response to an utterance of the user of the second vehicle acquired by the acquirer, the first agent controller provides information on the difference.

13. The agent device according to claim 12 further comprising:
a determiner configured to determine whether or not a difference is present between a first type and a second type based on first vehicle information including the first type of the agent controller utilizable in the first vehicle and second vehicle information including the second type of the agent controller utilizable in the second vehicle,
wherein the first agent controller provides information on the difference based on a result of determination of the determiner.

14. The agent device according to claim 1,
wherein when there is a difference between a task assigned to the first agent controller itself and a task assigned to the second agent controller provided with a service name the same as a name of a service provided from the first agent controller in the second vehicle, the first agent controller provides information on the difference between the assigned tasks.

15. The agent device according to claim 14 further comprising:
a determiner configured to determine whether or not a difference is present between the assigned tasks based on first vehicle information including the task assigned to the first agent controller in the first vehicle and second vehicle information including the task assigned to the second agent controller,
wherein the first agent controller provides information on the difference between the assigned tasks based on a result of determination of the determiner.

16. The agent device according to claim 1 further comprising:
a determiner configured to determine whether or not a difference is present between a third type and a fourth type based on first vehicle information including the third type of the agent controller assigned with the particular task of the first vehicle and second vehicle information including the fourth type of the agent controller assigned with the particular task of the second vehicle,
wherein the first agent controller provides information on the difference based on a result of determination of the determiner.

17. The agent device according to claim 1, which is mounted in a vehicle.

18. An agent system comprising:
an agent device, wherein the agent device comprises:
an acquirer configured to acquire an utterance of a user of a first vehicle; and
a first agent controller configured to perform processing for providing a service including causing an output device to output a response of voice in response to an utterance of the user of the first vehicle acquired by the acquirer,
wherein when there is a difference between a service which is utilizable in the first vehicle and is available from one or more agent controllers including at least the first agent controller and a service which is utilizable in a second vehicle and is available from one or more agent controllers, the first agent controller provides information on the difference,
a determiner configured to determine whether or not the difference is present based on first vehicle information on the first vehicle in which the user is on board and second vehicle information on the second vehicle which has been utilized before the user utilizes the first vehicle in accordance with information transmitted from the agent device; and
a server device configured to include a transmission controller transmitting particular information based on the difference to the agent device when the determiner determines that a difference is present,
wherein the first agent controller provides information on the difference based on the particular information transmitted from the transmission controller,
wherein the determiner determines whether or not a difference is present between a seventh type and an eighth type based on the seventh type of an agent controller performing processing for providing a service which is assigned with a particular task of the first vehicle and includes causing an output device to output a response of voice in response to an utterance of the user of the first vehicle acquired by the acquirer and the eighth type of an agent controller performing processing for providing a service which is assigned with a particular task of the second vehicle and includes causing an output device to output a response of voice in response to an utterance of the user of the second vehicle acquired by the acquirer,
wherein when the determiner determines that a difference is present, the transmission controller transmits particular information based on the difference between the seventh type and the eighth type to the agent device, and
wherein the first agent controller provides information on the difference between the seventh type and the eighth type based on the particular information transmitted from the transmission controller.

19. The agent system according to claim 18,
wherein the determiner determines whether or not a difference is present between a particular function of the first vehicle and a particular function of the second vehicle based on first vehicle information including a service provided upon execution of the particular function of the first vehicle and second vehicle information including a service provided upon execution of the particular function of the second vehicle in response to an utterance of the user,
wherein when the determiner determines that a difference is present between the particular functions, the transmission controller transmits particular information based on the difference between the particular functions to the agent device, and
wherein the first agent controller provides information on the difference based on the particular information transmitted from the transmission controller.

20. The agent system according to claim 18,
wherein the determiner determines whether or not a difference is present between degrees of freshness of information on a map based on first vehicle information including information on a degree of freshness of information on a map utilized in the first vehicle and second vehicle information including information on a degree of freshness of information on a map utilized in the second vehicle,
wherein when the determiner determines that a difference is present, the transmission controller transmits particular information based on the difference between the degrees of freshness of information on a map to the agent device, and
wherein the first agent controller provides information on the difference based on the particular information transmitted from the transmission controller.

21. The agent system according to claim 18,
wherein the determiner determines whether or not a difference is present between a fifth type and a sixth type based on first vehicle information including the fifth type of an agent controller performing processing for providing a service which is utilizable in the first vehicle and includes causing an output device to output a response of voice in response to an utterance of the user of the first vehicle acquired by the acquirer and second vehicle information including the sixth type of an agent controller performing processing for providing a service which is utilizable in the second vehicle and includes causing an output device to output a response of voice in response to an utterance of the user of the second vehicle acquired by the acquirer,
wherein when the determiner determines that a difference is present between the fifth type and the sixth type, the transmission controller transmits particular information based on the difference to the agent device, and wherein the first agent controller provides information on the difference based on the particular information transmitted from the transmission controller.

22. The agent system according to claim 18, wherein the determiner determines whether or not a difference related to the assigned task is present based on first vehicle information including a task assigned to the first agent controller in the first vehicle and second vehicle information including a task assigned to a second agent controller provided with a service name the same as a name of a service provided from the first agent controller in the second vehicle, wherein when the determiner determines that a difference is present, the transmission controller transmits particular information based on the difference between the tasks to the agent device, and wherein the first agent controller provides information on the difference between the assigned tasks based on the particular information transmitted from the transmission controller.

\* \* \* \* \*